(12) United States Patent
Nam et al.

(10) Patent No.: US 10,949,060 B2
(45) Date of Patent: Mar. 16, 2021

(54) METHOD FOR SWITCHING APPLICATIONS, AND ELECTRONIC DEVICE THEREOF

(71) Applicant: Samsung Electronics Co., Ltd., Gyeonggi-do (KR)

(72) Inventors: Seung Wook Nam, Gyeonggi-do (KR); Youngmi Kim, Seoul (KR); Youngseong Kim, Seoul (KR); Hyo-Sang Bang, Seoul (KR); Sangsu Lee, Daejeon (KR); Youngjay Lee, Gyeonggi-do (KR); Jae Myoung Lee, Seoul (KR); Kyungsoo Lim, Gyeonggi-do (KR); Soe-Youn Yim, Seoul (KR); Martin Jung, Seoul (KR); Jinhoon Cho, Gyeonggi-do (KR); Hyun Yeul Lee, Seoul (KR)

(73) Assignee: Samsung Electronics Co., Ltd

( * ) Notice: Subject to any disclaimer, the term of this patent is extended or adjusted under 35 U.S.C. 154(b) by 144 days.

(21) Appl. No.: 15/885,171

(22) Filed: Jan. 31, 2018

(65) Prior Publication Data

US 2018/0217736 A1    Aug. 2, 2018

(30) Foreign Application Priority Data

Jan. 31, 2017    (KR) .................. 10-2017-0013728

(51) Int. Cl.
*G06F 3/0481* (2013.01)
*G06F 3/0482* (2013.01)
(Continued)

(52) U.S. Cl.
CPC ........ *G06F 3/04817* (2013.01); *G06F 3/0482* (2013.01); *G06F 3/04842* (2013.01); *G06F 3/04883* (2013.01); *G06F 3/04886* (2013.01)

(58) Field of Classification Search
CPC ............... G06F 3/04817; G06F 3/0482; G06F 3/04842; G06F 9/542; G06F 9/4806
See application file for complete search history.

(56) References Cited

U.S. PATENT DOCUMENTS

| 5,757,371 | A | * | 5/1998 | Oran | ..................... | G06F 3/0481 |
|||||||715/779|
| 6,215,490 | B1 | * | 4/2001 | Kaply | .................. | G06F 3/0481 |
|||||||715/788|

(Continued)

FOREIGN PATENT DOCUMENTS

KR    20130076397    7/2013

OTHER PUBLICATIONS

International Search Report dated May 17, 2018 issued in counterpart application No. PCT/KR2018/001350, 10 pages.
(Continued)

*Primary Examiner* — Nhat Huy T Nguyen
(74) *Attorney, Agent, or Firm* — The FArrell Law Firm, P.C.

(57) ABSTRACT

A device and method for switching applications in an electronic device are described. An electronic device includes a display and at least one processor. The at least one processor controls the display to display execution information on a first application and to display an application switch object in at least a portion of the display along with the displayed execution information on the first application when input for displaying the application switch object is received while the first application is executed. The application switch object includes at least one first object corresponding to an application usage history of the electronic device, a second object corresponding to the first application, and at least one third object corresponding to at least one second application executable in the electronic device.

20 Claims, 29 Drawing Sheets

(51) Int. Cl.
G06F 3/0484 (2013.01)
G06F 9/54 (2006.01)
G06F 9/48 (2006.01)
G06F 3/0488 (2013.01)

(56) References Cited

U.S. PATENT DOCUMENTS

| | | | |
|---|---|---|---|
| 9,798,579 B2* | 10/2017 | Park | G06F 9/4843 |
| 2009/0327953 A1 | 12/2009 | Honkala et al. | |
| 2010/0281481 A1* | 11/2010 | Rainisto | G06F 3/0481 |
| | | | 718/100 |
| 2011/0145744 A1* | 6/2011 | Haynes | G06F 3/0481 |
| | | | 715/766 |
| 2012/0185803 A1 | 7/2012 | Wang et al. | |
| 2014/0068518 A1 | 3/2014 | Liu et al. | |
| 2014/0237426 A1 | 8/2014 | Terazono et al. | |
| 2015/0169071 A1 | 6/2015 | Jitkoff | |
| 2015/0169146 A1* | 6/2015 | Lalwani | G06F 3/0482 |
| | | | 715/811 |
| 2016/0328143 A1 | 11/2016 | Hu et al. | |

OTHER PUBLICATIONS

European Search Report dated Jan. 9, 2020 issued in counterpart application No. 18747651.0-1203, 7 pages.

* cited by examiner

METHOD FOR SWITCHING APPLICATIONS, AND ELECTRONIC DEVICE THEREOF

PRIORITY

This application claims the priority under 35 U.S.C. § 119(a) to Korean Patent Application Serial No. 10-2017-0013728, which was filed in the Korean Intellectual Property Office on Jan. 31, 2017, the entire content of which is incorporated herein by reference.

BACKGROUND

1. Field of the Disclosure

The present disclosure relates generally to a device and a method for application management and, more particularly, to a method and electronic device for switching between applications in an electronic device.

2. Description of the Related Art

With the development of information and communication technologies and semiconductor technology, various electronic devices are evolving into multimedia devices providing a variety of multimedia services. For example, electronic devices provide diverse services, such as voice call services, message services, broadcast services, wireless Internet services, camera services, and music playback services.

The various services used by the user are provided using applications installed in the electronic devices. For example, an electronic device may include a music application for playing music desired by a user, a call application for a voice call service, and a camera application for a camera service.

SUMMARY

An electronic device may display an individual application on a display in the form of an icon so that a user may identify the application installed in the electronic device. The electronic device executes the application corresponding to an icon when the icon is selected by the user among the icons displayed on the display. However, the user of the electronic device may need to perform multiple operations in order to switch from an application running on the electronic device to another application, which is inconvenient. For example, to use a second application while a first application is running, the user of the electronic device may have to switch the electronic device into standby mode (such as an idle screen) through a first operation. Next, the user of the electronic device searches for an icon corresponding to the second in application through a second operation and then executes the second application by selecting the icon through a third operation, which is inconvenient.

According to one aspect, embodiments of the present disclosure provide a device and a method for easily switching between applications in an electronic device.

According to one aspect of the present disclosure, an electronic device includes a display; and at least one processor which controls the display to display execution information on a first application and an application switch object in at least a portion of the display with the execution information on the first application when input for displaying the application switch object is received while the first application is being executed, where the application switch object includes at least one first object corresponding to an application usage history of the electronic device, a second object corresponding to the first application, and at least one third object corresponding to at least one second application executable in the electronic device.

According to one aspect of the present disclosure, a method of an electronic device includes executing a first application; displaying execution information on the first application on a display of the electronic device; and displaying an application switch object in at least a portion of the display with the execution information on the first application when input for displaying the application switch object is received while the first application is being executed, where the application switch object includes at least one first object corresponding to an application usage history of the electronic device, a second object corresponding to the first application, and at least one third object corresponding to at least one second application executable in the electronic device.

BRIEF DESCRIPTION OF THE DRAWINGS

The above and other aspects, features, and advantages of embodiments of the present disclosure will be more apparent from the following detailed description, taken in conjunction with the accompanying drawings, in which.

DETAILED DESCRIPTION

Figure 1:
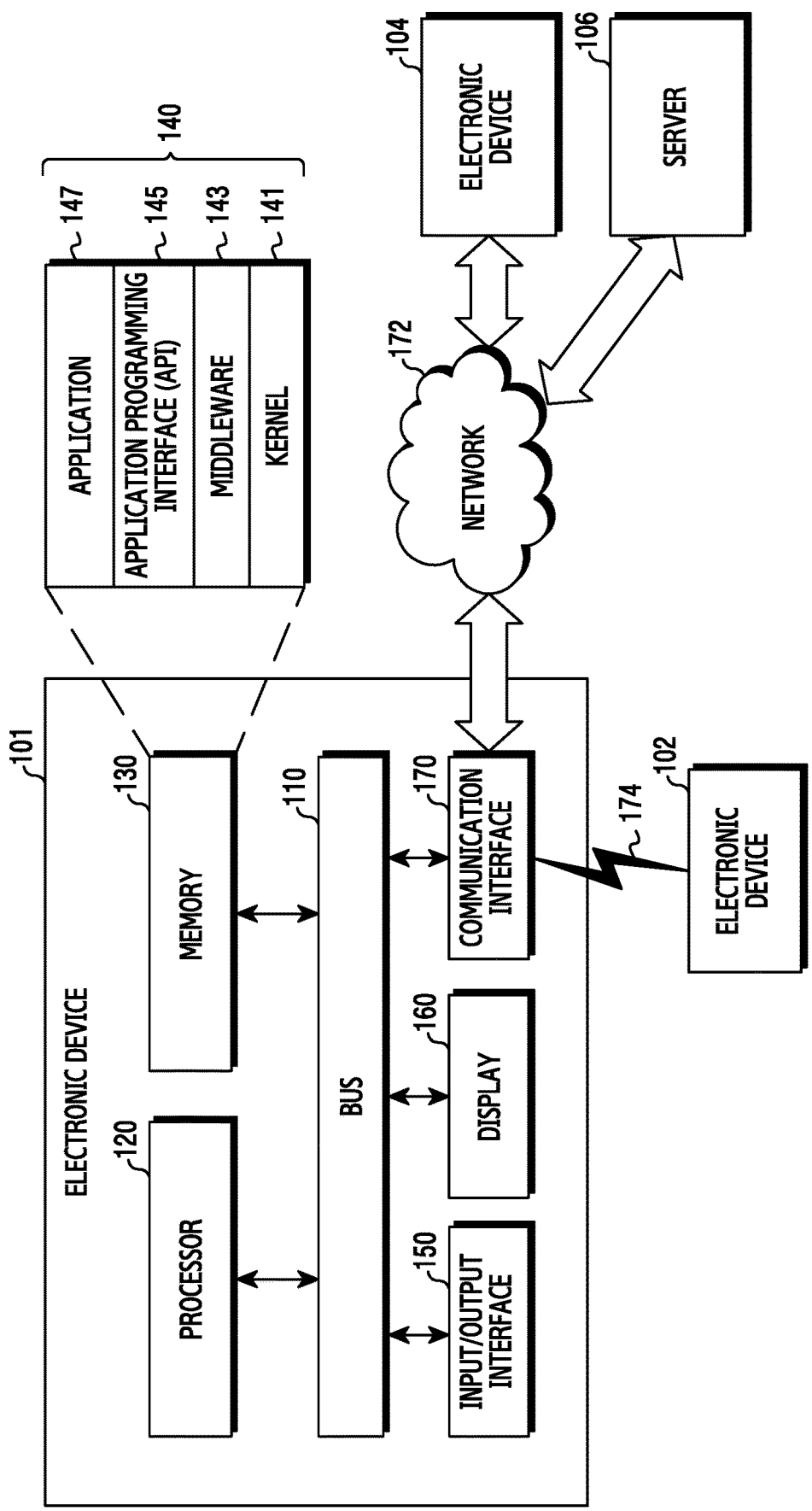
FIG. 1 is a diagram illustrating an electronic device in a network environment according to various embodiments of the present disclosure.

Hereinafter, various embodiments of the present document are described with reference to the accompanying drawings. It should be understood, however, that the present disclosure is not limit to the various embodiments of the present document disclosed herein, but on the contrary, the present disclosure is intended to cover all modifications, equivalents, and alternatives falling within the spirit and scope of the present disclosure.

Like reference numerals may denote like components throughout the drawings. A singular expression includes the plural unless expressly indicated otherwise. Expressions or lists such as "A or B", "A and/or B", or the like, may include all possible combinations of the items listed. Although expressions such as "$1^{st}$", "$2^{nd}$", "first", and "second" may be used to identify components/elements, such expressions are purely for identification, and do not define the components/elements in any order, priority, etc. When a certain (e.g., $1^{st}$) component/element is described as being "operatively or communicatively coupled with/to" or "connected to" a different (e.g., $2^{nd}$) component/element, the certain component/element may be directly coupled with/to the other component/element (i.e., $2^{nd}$) or may be connected with/to the different component/element (i.e., $2^{nd}$) via another (e.g., $3^{rd}$) component/element.

The expression "configured to" as used in the present disclosure may be interchangeably used with, for example, "suitable for", "having the capacity to", "adapted to", "made to", "capable of", or "designed to" in a hardware or software manner according to the situation/context. In a certain situation/context, the expression "a device configured to" may mean that the device is "capable of". For example, "a processor configured to perform A, B, and C" may mean a dedicated processor (e.g., an embedded processor) for performing a corresponding operation or a generic-purpose processor (e.g., central processing unit (CPU) or an application processor (AP)) capable of performing that corresponding operation as well as many other operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device, such as, e.g., smart glasses, a head-mounted-device (HMD), electronic clothes, an electronic bracelet, an electronic necklace, an electronic appcessory, an electronic tattoo, a smart mirror, or a smart watch.

According to some embodiments, the electronic device may be a home appliance, such as any one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments of the present disclosure, the electronic device may be any one of various medical devices (e.g., various portable medical measuring devices (a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionic devices for flying, security devices, an automotive head unit, a robot for home or industry, an automatic teller machine (ATM), a point of sale (POS) device, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may be a part of furniture or a building/structure, an electronic board, an electronic signature receiving device, a projector, and one of various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device (or foldable device). Further, the electronic device according to the present disclosure is not limited to any of the aforementioned devices, and may be a new type of electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates an electronic device 101 within a network environment 100 according to various embodiments of the present disclosure.

Referring to FIG. 1, the electronic device 101 includes a bus 110, a processor 120 (e.g., including processing circuitry), a memory 130, an input/output interface 150 (e.g., including input/output circuitry), a display 160 (e.g., including display circuitry), and a communication interface 170 (e.g., including communication circuitry). In some embodiment, the electronic device 101 may omit at least one of these components/elements or have additional components/elements.

The bus 110 may, for example, include circuitry for connecting the elements 120 to 170 with one another and forwarding communication (e.g., a control message and/or data) between the elements.

The processor 120 may be one or more of a CPU, an AP, a communication processor (CP) or an image signal processor (ISP). The processor 120 executes operations, such as data processing, control operations, and/or communication operations, for itself and for other element of the electronic device 101.

According to one embodiment, the processor 120 performs control of the display 160 to display application execution information (i.e., execution information of a presently executing application, such as a home screen or service screen). The processor 120 may control the display 160 to display one or more icons, where each icon corresponds to an individual application installed in the electronic device 101. When the selection of an icon displayed on the display 160 is detected, the processor 120 controls the display 160 to display a service screen of the application corresponding to the selected icon (i.e., application execution information).

According to one embodiment, the processor 120 controls the display 160 to display an application switch object in at least a portion of the display 160 while displaying application execution information on the display 160. For example, the processor 120 may check whether an event for displaying the application switch object occurs while the application execution information is being displayed on the display 160. When the occurrence of an event for displaying the application switch object is detected, the processor 120 controls the display 160 to display the application switch object in at least a portion of the display 160 while maintaining display of the application execution information. An event for displaying the application switch object may occur, for example, based on selection input from a button for displaying an application switch object (e.g., a recent key), touch input in a preset area (e.g., swipe input in a first direction), and pressure input in a preset area.

According to one embodiment, the processor 120 configures an application switch object to include an application usage history of the electronic device 101, execution information of an application presently executing on the electronic device 101, and a list of one or more recommended applications (or recommended applications list). The application usage history may include, for example, at least one object (e.g., an icon) corresponding to at least one application selected in an order based on the execution time among the applications executed in the electronic device 101. The execution information may include, for example, an object (e.g., an icon) corresponding to an application running in the electronic device 101. For instance, the object may include at least one of an icon corresponding to the application and summary information (in, e.g., a thumbnail image) of the application. The list of one or more recommended applications may include, for example, at least one object (e.g., an icon) corresponding to at least one application determined to be available to and suitable for a user of the electronic device 101. For example, the processor 120 may select recommended applications by prioritizing the execution possibility of individual applications based on at least one of application execution numbers (i.e., the number of times the application was used), application execution order (i.e., the relative sequence the application was executed in relation to other applications), application execution time (i.e., the times of day the application was executed), application execution frequency (i.e., the number of times the application was executed during a preset time period), application execution location (i.e., the locations where the application was executed), and application execution duration (i.e., the lengths of time the application was executed). The processor 120 may then set at least one application having a high priority as a recommended application.

In one embodiment, when there is an application belonging to both the application usage history and the recommended applications, the processor 120 may update the application by, for instance, updating it to an application of the highest priority among the recommended applications.

According to one embodiment, the processor 120 may control running of an application with application execution information and an application switch object displayed on the display 160. For example, the processor 120 may check whether an input (e.g., touch input or pressure input) corresponding to the application execution information is detected while the application execution information and the application switch object are displayed on the display 160. When an input corresponding to the application execution information is detected, the processor 120 performs a function mapped to the input on the running application. For example, the processor 120 may control the display 160 to display an execution screen of the function mapped to the input corresponding to the application execution information.

According to one embodiment, the processor 120 may switch an application running on the electronic device 101 based on input to an application switch object displayed on the display 160. For example, when an input corresponding to the application switch object is detected, the processor 120 may execute an application corresponding to an item/object from which the input was detected among a plurality of items/objects forming the application switch object. For example, the processor 120 may control the display 160 to update the displayed application execution information to display execution information on the application corresponding to the item/object from which the input is detected. When an application running on the electronic device 101 is switched to another application, the processor 120 may update the application switch object to correspond to the other application. For example, the processor 120 may update a usage history and an executed application list that form the application switch object to correspond to the execution of the other application or the processor 120 may update the application switch object to include a recommended application associated with the other application.

According to one embodiment, the processor 120 updates the application switch object based on a notification event while application execution information and the application switch object are displayed on the display 160. For example, when a message is received with the application switch object displayed, the processor 120 may update the application switch object such that an message application is included in the recommended applications list of the application switch object. Specifically, the processor 120 may change the application of the lowest priority among the plurality of applications displayed as recommended applications to the message application.

According to one embodiment, the processor 120 updates the application switch object based on location information of the electronic device 101 while application execution information and the application switch object are displayed on the display 160. For example, the processor 120 may identify the location information on the electronic device 101 through a satellite signal, a beacon signal, or triangulation. When there is a recommended application associated with the identified location of the electronic device 101, the processor 120 updates the application switch object to include the recommended application associated with the location of the electronic device 101. For example, the processor 120 may change the application of the lowest priority among the plurality of applications displayed as recommended applications to the recommended application associated with the location of the electronic device 101. The recommended application associated with the location of the electronic device 101 may be, for example, an application that has been executed a reference/threshold number of times or more at the identified location (e.g., place) of the electronic device 101.

According to one embodiment, the processor 120 updates the application switch object based on current time information while application execution information and the application switch object are displayed on the display 160. For example, when there is an application associated with a current time, the processor 120 may update the application switch object to include the application associated with the current time in the recommended applications list. Specifically, the processor 120 may change the application of the lowest priority among the plurality of applications displayed as recommended applications to the recommended application associated with the current time. The recommended application associated with the current time may be, for example, one or more applications that are repeatedly executed a reference/threshold number of times or more at the current time period.

According to one embodiment, the processor 120 controls the display 160 to eliminate an application switch object based on an object elimination event while application execution information and the application switch object are displayed on the display 160. For example, an event for eliminating the application switch object may occur based on selection input from a button for eliminating an application switch object (e.g., a recent key), touch input in a preset area (e.g., swipe input in a second direction), pressure input in a preset area, and retention time for an application switch object. When the occurrence of an event for eliminating the application switch object is detected, the processor 120 controls the display 160 to eliminate the application switch object. In one embodiment, the processor 120 may control the display 160 to expand a display range of the application execution information to fill display space emptied by the elimination of the application switch object.

The memory 130 may include a volatile and/or nonvolatile memory. The memory 130 may store, for example, a command or data related to at least one component/element of the electronic device 101. According to one embodiment, the memory 130 may store an application usage history of the electronic device 101 and recommended application information. The recommended application information may include, for example, a recommended application list associated with at least one of a particular application, a particular location, and particular time.

The memory 130 stores software and/or a program 140. The program 140 may includes a kernel 141, middleware 143, an application programming interface (API) 145, and an application (or "app") 147. At least some of the kernel 141, the middleware 143, and the API 145 may be part of an operating system (OS).

The kernel 141 controls or manages system resources (for example, the bus 110, the processor 120, the memory 130, or the like) used to perform an operation or function implemented in, for example, the middleware 143, the API 145, or the application 147. Further, the kernel 141 may provide an interface that allows the middleware 143, the API 145, or the application 147 to access individual components/elements of the electronic device 101 to thereby control or manage system resources.

The middleware 143 serves as a relay so that, for example, the API 145 or the application 147 communicates with the kernel 141 to exchange data. Further, the middleware 143 may process one or more requests for operations received from the application 147 according to the priority thereof. For example, the middleware 143 may assign an application 147 a priority for using a system resource of the electronic device 101 (for example, the bus 110, the processor 120, the memory 130, or the like) and may process one or more requests for operations from the application according to that priority. The API 145 is an interface for the application 147 to control a function provided from the kernel 141 or the middleware 143, and may include, for example, at least one interface or function (for example, a command) for file control, window control, image processing, or text control.

The input/output interface 150 serves as an interface that delivers a command or data, which is input from a user or a different external device, to a different components) of the electronic device 101. The input/output interface 150 may include, for example, at least one physical button, such as a home button, a power button, and a volume control button. The input/output interface 150 may include, for example, a speaker for outputting an audio signal and a microphone for collecting an audio signal.

The display 160 displays various types of content (e.g., a text, an image, a video, an icon, and/or a symbol). The display 160 may be, for example, a liquid crystal display (LCD), a light-emitting diode (LED) display, an organic light-emitting diode (OLED) display, a micro-electro-mechanical system (MEMS) display, or an electronic paper display.

According to one embodiment, the display 160 displays an application switch object to overlap with at least part of the displayed application execution information. For example, when an event for displaying an application switch object is detected, the display 160 may display an application switch object to overlap with at least part of application execution information using a display layer different from a display layer where the application execution information is displayed.

According to one embodiment, the display 160 displays application execution information and an application switch object in different areas. For example, when an event for displaying an application switch object is detected, the display 160 may reduce a display area for application execution information and display the application switch object in the open display area obtained by reducing the display area for the application execution information.

According to one embodiment, the display 160 includes a display panel and a touch panel. The display 160 may receive, for example, touch, gesture, proximity, or hovering input using an electronic pen or a body part of a user through the touch panel. The display panel and the touch panel may entirely or at least partly overlap each other. The display 160 may further include a pressure panel, which may receive pressure input by a body part of a user or an object. The display panel, the touch panel, and the pressure panel may be implemented entirely in one component or overlap each other in more than one component.

The communication interface 170 establishes communication between the electronic device 101 and an external device (for example, a first external electronic device 102, a second external electronic device 104, or a server 106). The communication interface 170 is connected to a network 172 via wireless communication or wired communication and may establish communication with the external device (for example, the second external electronic device 104 or the server 106) through the network 172.

According to one embodiment, the communication interface 170 provides wireless communication, which includes cellular communication using at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). According to the embodiment in FIG. 1, the provided wireless communication includes short-range communication 174 using at least one of wireless fidelity (Wi-Fi), Bluetooth, Bluetooth low energy (BLE), ZigBee, near-field communication (NFC), magnetic secure transmission, radio frequency (RF), and body area network (BAN). According to one embodiment, the wireless communication may include global navigation satellite system (GNSS) reception. The GNSS may be, for example, the global positioning system (GPS), a global navigation satellite system (GLONASS), a BeiDou navigation satellite system, or Galileo, which is the European global satellite-based navigation system. In the present disclosure, "GPS" may be interchangeably used with "GNSS" hereinafter. According to one embodiment, the wired communication may include at least one of universal serial bus (USB), high-definition multimedia interface (HDMI), recommended standard 232 (RS-232), power-line communication, and plain old telephone service (POTS). The network 172 may include at least one of a computer network (for example, a Local Area Network (LAN) or Wide Area Network (WAN)), the Internet, and a telecommunications network.

Each of the first external electronic device 102 and second external electronic device 104 may be a device of a type that is the same as, or different from, that of the electronic device 101. According to various embodiments, all or some of the operations performed in the electronic device 101 may be performed in another electronic device or a plurality of electronic devices (for example, the electronic devices 102 and 104 or the server 106).

Figure 2:
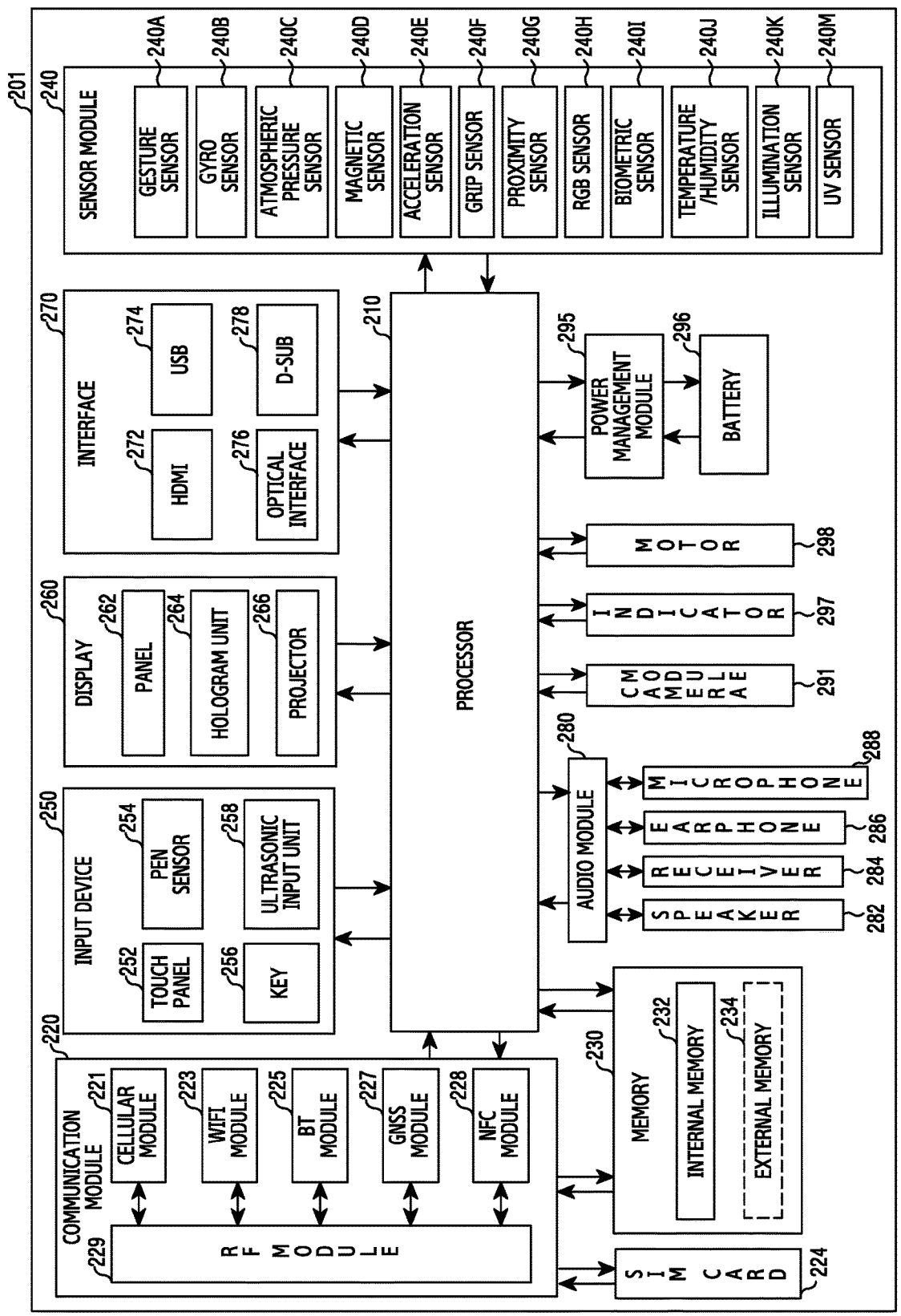
FIG. 2 is a block diagram illustrating an electronic device according to various embodiments of the present disclosure.

FIG. 2 is a block diagram illustrating an electronic device 201 according to various embodiments. The electronic device 201 may include, for example, the entirety or a part of the electronic device 101 illustrated in FIG. 1. The electronic device 201 includes one or more processors (e.g., APs) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processors 210 run, for example, an operating system and/or applications to control a plurality of hardware or software components that are connected to the processors 210, and may perform various kinds of data processing and operations. The processors 210 may be configured, for example, as a system on chip (SoC). According to one embodiment, the processors 210 may further include a graphic processing unit (GPU) and/or an image signal processor (ISP). The processors 210 may include at least some of the components illustrated separately in FIG. 2 (for example, cellular module 221). The processors 210 may load a command or data received from nonvolatile memory into volatile memory to process the command or data, and may store resultant data in the nonvolatile memory.

According to one embodiment, the processors 210 controls the display 260 to display an application switch object in at least a portion of the display 260 while application execution information is displayed on the display 260. The processors 210 may continuously control running of an application based on an input corresponding to the application execution information. The processors 210 may switch an application running on the electronic device 201 based on input from an application switch object.

The communication module 220 may have a configuration that is the same as, or similar to, that of the communication interface 170 in FIG. 1. The communication module 220 includes a cellular module 221, a Wi-Fi module 223, a Bluetooth module 225, a GNSS module 227, an NFC module 228, and an RF module 229.

The cellular module 221 may provide, for example, a voice call, a video call, a text messaging service, or an Internet service through a communication network. The cellular module 221 may perform identification and authentication of the electronic device 201 in a communication network using subscriber identity module (SIM) 224 (for example, a SIM card). The cellular module 221 may perform at least some of the functions provided by the processors 210. According to one embodiment, the cellular module 221 may include a CP.

According to one embodiment, at least some (for example, two or more) of the cellular module 221, the Wi-Fi module 223, the Bluetooth module 225, the GNSS module 227, and the NFC module 228 may be included in one integrated chip (IC) or IC package.

The RF module 229 transmits and receives, for example, an RF communication signal. The RF module 229 may include, for example, a transceiver, a power amplifier module (PAM), a frequency filter, a low-noise amplifier (LNA), an antenna, and the like. According to another embodiment, at least one of the cellular module 221, the Wi-Fi module 223, the Bluetooth module 225, the GNSS module 227, and the NFC module 228 may transmit and receive an RF signal through a separate RF module. The SIM 224 may be, for example, a card including a SIM or an embedded SIM, and may include unique identification information, for example, an integrated circuit card identifier (ICCID), or subscriber information, for example, an international mobile subscriber identity (IMSI).

The memory 230 includes, for example, an internal memory 232 or an external memory 234. The internal memory 232 may include at least one of a volatile memory, for example, a dynamic random-access memory (DRAM), a static RAM (SRAM), a synchronous dynamic RAM (SDRAM), and/or the like, and a nonvolatile memory, for example, a one-time programmable read-only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid-state drive (SSD). The external memory 234 may include a flash drive, such as, for example, compact flash (CF), secure digital (SD), micro secure digital (micro-SD), mini secure digital (mini-SD), extreme digital (xD), a multi-media card (MMC), a memory stick, or the like. The external memory 234 may be functionally or physically connected to the electronic device 201 through any of various interfaces, as would be understood by one of ordinary skill in the art.

The sensor module 240 measures, for example, physical quantities, or may detect the state of operation of the electronic device 201, and converts measured or detected information into an electrical signal. The sensor module 240 includes a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor as a part of the processors 210 or separately from the processors 210, configured to control the sensor module 240, thereby controlling the sensor module 240 while the processors 210 are in a sleep state.

The input device 250 includes a touch panel 252, a (digital) pen sensor 254, a key 256, and an ultrasonic input device 258. The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response (at the coordinates of a touch input). The (digital) pen sensor 254 may, for example, be used with the touch panel 252 or may be used with a separate recognition sheet/device. The key 256 may include, for example, a physical button, an optical key, or a keypad. The ultrasonic input device 258 may detect ultrasonic waves generated in an input tool through a microphone 288 and may identify data corresponding to the detected ultrasonic waves.

The display 260 includes a panel 262, a hologram device 264, and a projector 266, and may include a control circuit to control the panel 262, the hologram device 264, and/or the projector 266. The panel 262 may be configured, for example, to be flexible, transparent, or wearable. The panel 262 may be formed with the touch panel 252 as a single body/component, or in one or more components separate from touch panel 252. According to one embodiment, the panel 262 may include a pressure sensor (or force sensor) to measure pressure information on a users touch (e.g., the coordinates of pressure and the strength of pressure). The pressure sensor may be formed with the touch panel 252 in a single body/component, or may be provided as one or more sensors or components separate from the touch panel 252. The panel 262 may include a fingerprint sensor to detect fingerprint information on a user's touch (e.g., a fingerprint image). The fingerprint sensor may be formed with the touch panel 252 in a single body, or may be provided as one or more sensors separate from the touch panel 252. The hologram device 264 displays a three-dimensional image in the air using light interference. The projector 266 projects light onto a screen to display an image. The screen may be disposed, for example, inside or outside the electronic device 201. The interface 270 includes an HDMI 272, a USB 274, an optical interface 276, and a D-subminiature (D-sub) interface 278. The interface 270 may be constituted, for example, like the communication interface 170 illustrated in FIG. 1. Additionally or alternatively, the interface 270 may include, for example, a mobile high-definition link (MHL) interface, an SD card/MMC interface, or an infrared data association (IrDA) interface.

The audio module 280 may convert, for example, a sound into an electrical signal and/or an electrical signal into a sound. At least some components of the audio module 280 may be included in the input/output interface 150 illustrated in FIG. 1. The audio module 280 may process sound information input or output, for example, through a speaker 282, a receiver 284, earphones 286, or the microphone 288. The camera module 291 is a device that takes a still image and a video. According to one embodiment, the camera module 291 may include one or more image sensors (for example, a front sensor or a rear sensor), a lens, an ISP, or a flash (for example, an LED, a xenon lamp, or the like). The power management module 295 manages for example, the power of the electronic device 201. According to one embodiment, the power management module 295 may include a power management integrated circuit (PMIC), a charger IC, or a battery gauge. The PMIC may have wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 displays the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. The electronic device 201 may include a mobile TV support device (for example, a GPU) that is capable of processing media data in accordance with, for example, digital multimedia broadcasting (DMB), digital video broadcasting (DVB), or media-Flo™ standards.

Each element/component mentioned in the present disclosure may include one or more components, and may be designated by different terms depending on the type of the electronic device. In various embodiments of the present disclosure, an electronic device may be configured such that some elements in embodiments described herein are omitted, additional elements are further included, or some of the elements are combined into one entity, but may perform the same functions as those of the corresponding elements before combination.

Figure 3:
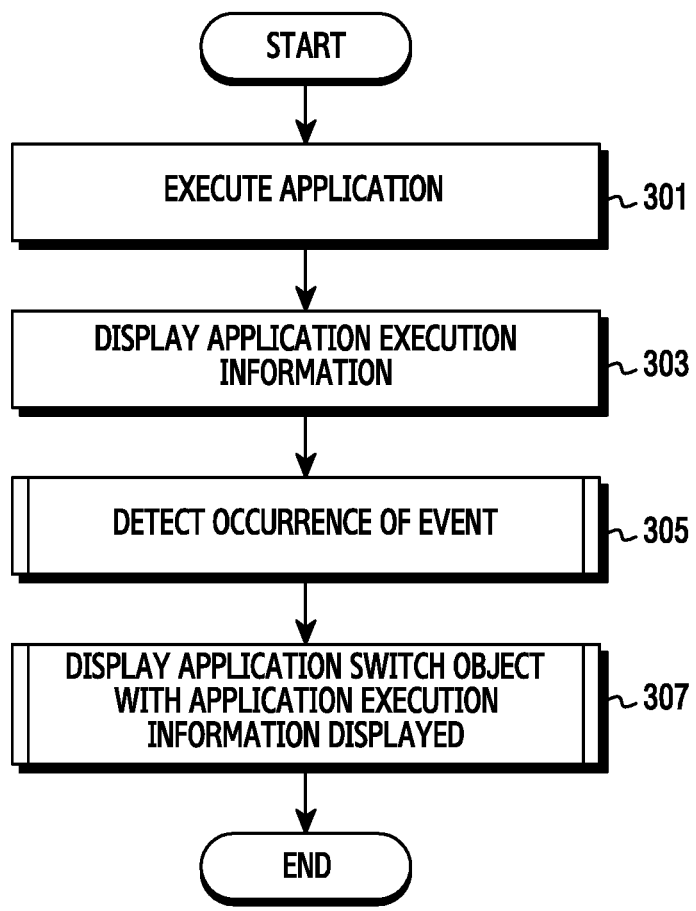
FIG. 3 is a flowchart illustrating a method by which an electronic device outputs an application switch object according to various embodiments of the present disclosure.

FIG. 3 is a flowchart illustrating a method by which an electronic device outputs an application switch object according to various embodiments of the present disclosure. FIGS. 4A to 4F are diagrams which illustrate the characteristics of an event for displaying an application switch object in an electronic device according to various embodiments of the present disclosure. In the following description of the figures below, the electronic device may be, for example, the electronic device 101 of FIG. 1, at least a part (e.g., the processor 120) of the electronic device 101, the electronic device 201 of FIG. 2, or at least a part of the electronic device 201.

Referring to FIG. 3, the electronic device executes an application installed in the electronic device in operation 301. For example, the processor 120 of the electronic device 101 may control the display 160 of the electronic device 101 to display at least one icon corresponding to at least one individual application among applications installed in the electronic device. When a touch input for selecting an icon is detected, the processor 120 loads data for running an application corresponding to the icon selected by detected touch input, which is stored in a memory 130 or onto a drive buffer of the processor 120.

Figure 4A:
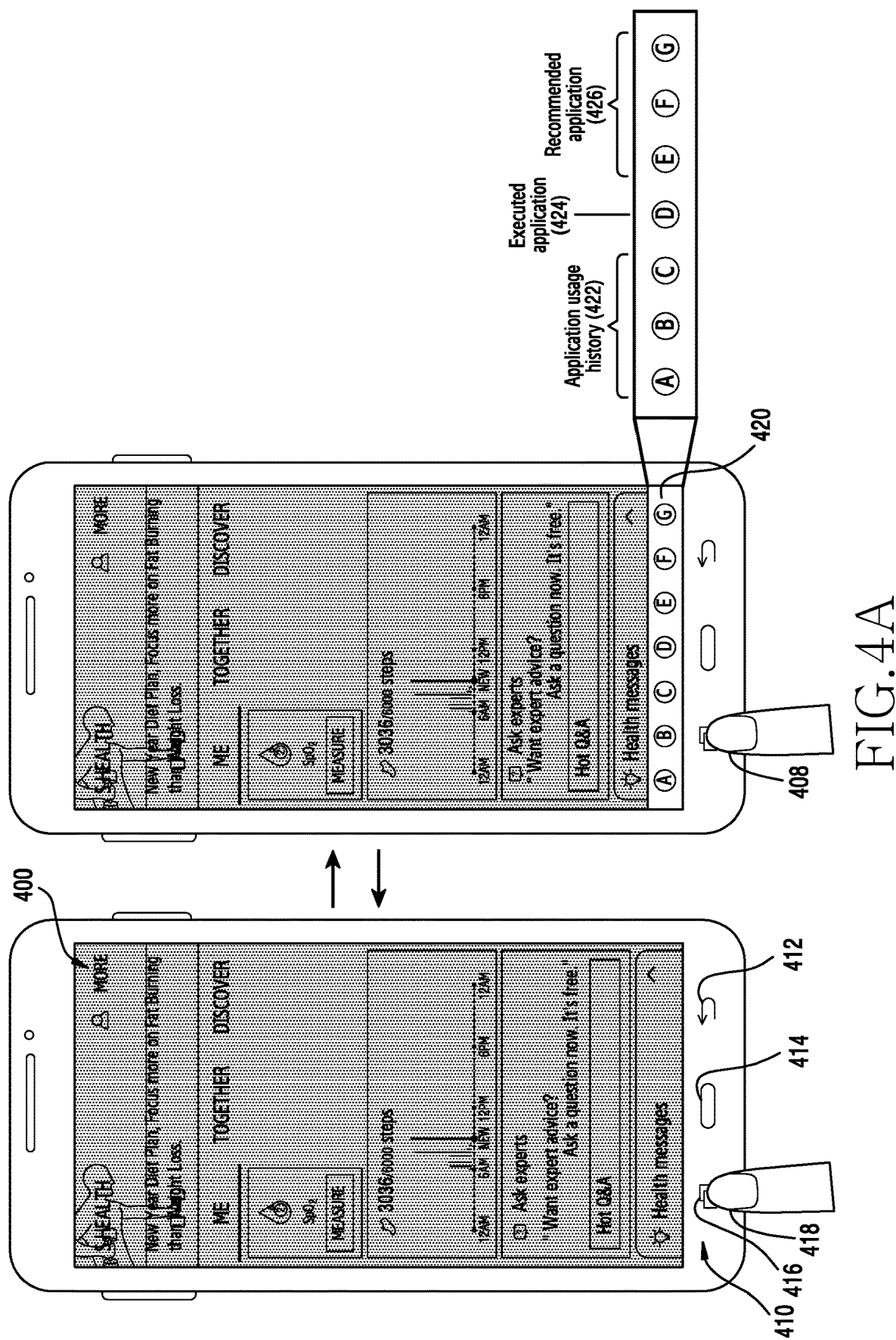
FIGS. 4A to 4F are diagrams illustrating the characteristics of an event for displaying an application switch object in an electronic device according to various embodiments of the present disclosure.
Figure 4B:
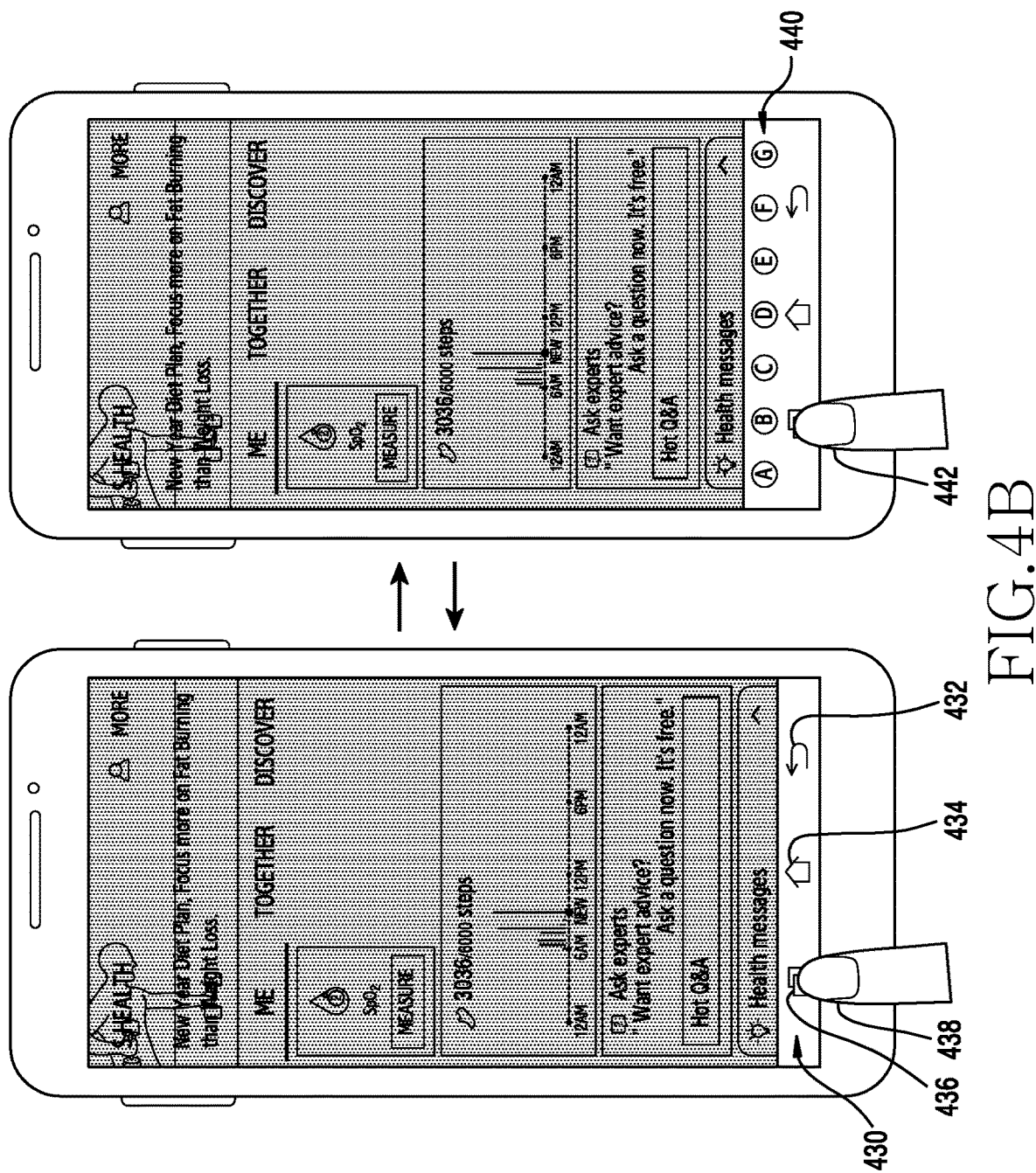

In operation 303, the electronic device displays execution information on the application running on the electronic device on the display. For example, when an exercise/health application is selected, the processor 120 may control the display 160 to display a service screen 400 of the exercise/health application, as shown in FIGS. 4A or 4B. In FIG. 4A, the electronic device 101 includes hardware buttons 410, which include a home button 414 and touch pads 412 and 416 disposed on the left and right sides of the home button 414, respectively. In FIG. 4B, the electronic device 101 includes software buttons 430 displayed in at least a portion of the display 160. The software buttons 430 includes a home button 434, a back key 432 disposed on the left side of the home button 434, and a recent key 436 disposed on the right side of the home button 434.

In operation 305, the electronic device detects the occurrence of an event for displaying an application switch object with the application execution information already displayed on the display. For example, referring to FIG. 4A, when selection input 418 of the recent key 416 disposed on the right side of the home button 414 is detected, the processor 120 determines that an event for displaying an application switch object has occurred; or, referring to FIG. 4B, when selection input 438 of the recent key 436 disposed on the right side of the home button 434 is detected, the processor 120 determines that an event for displaying an application switch object has occurred.

Figure 4C:
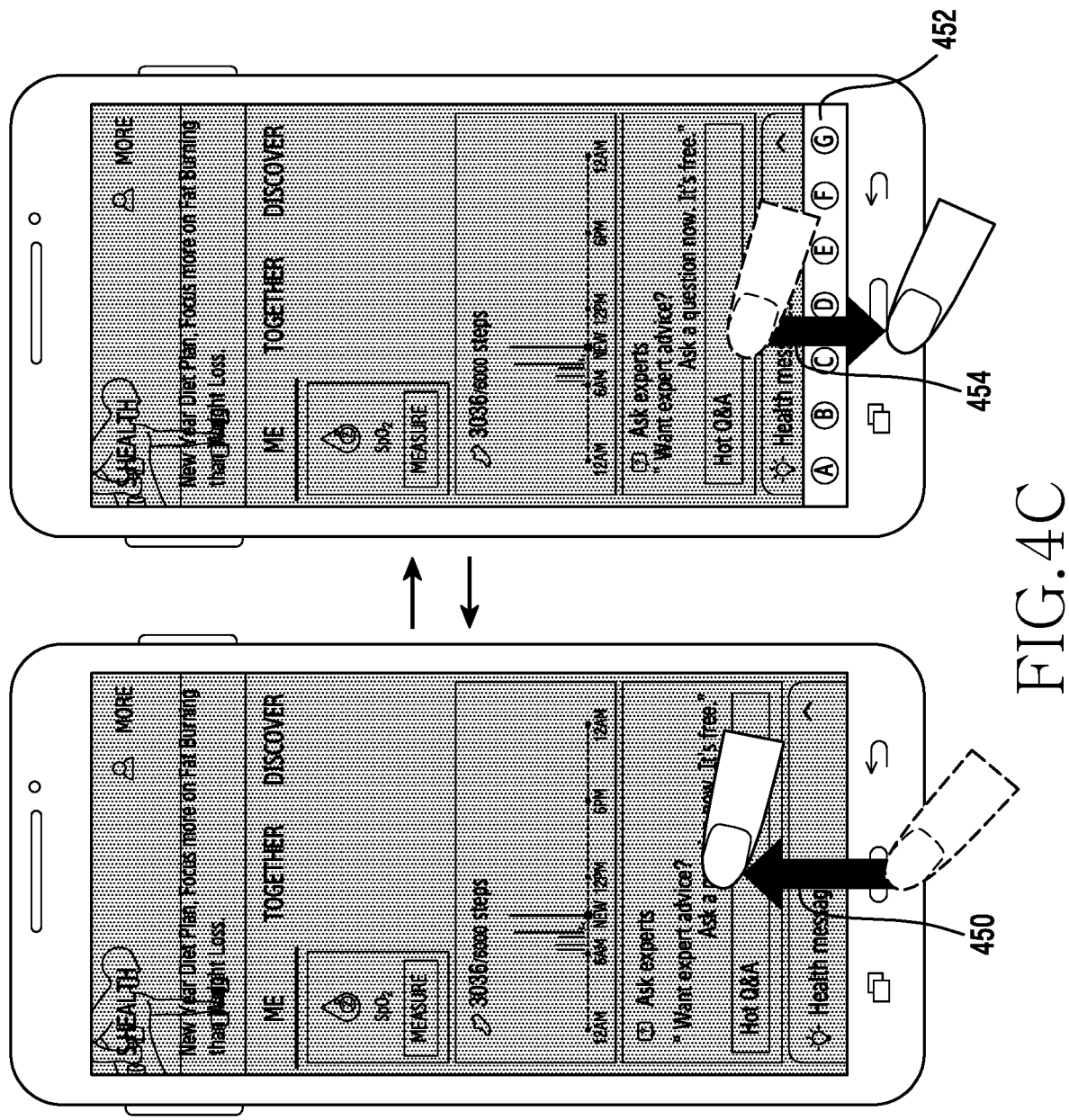
Figure 4D:
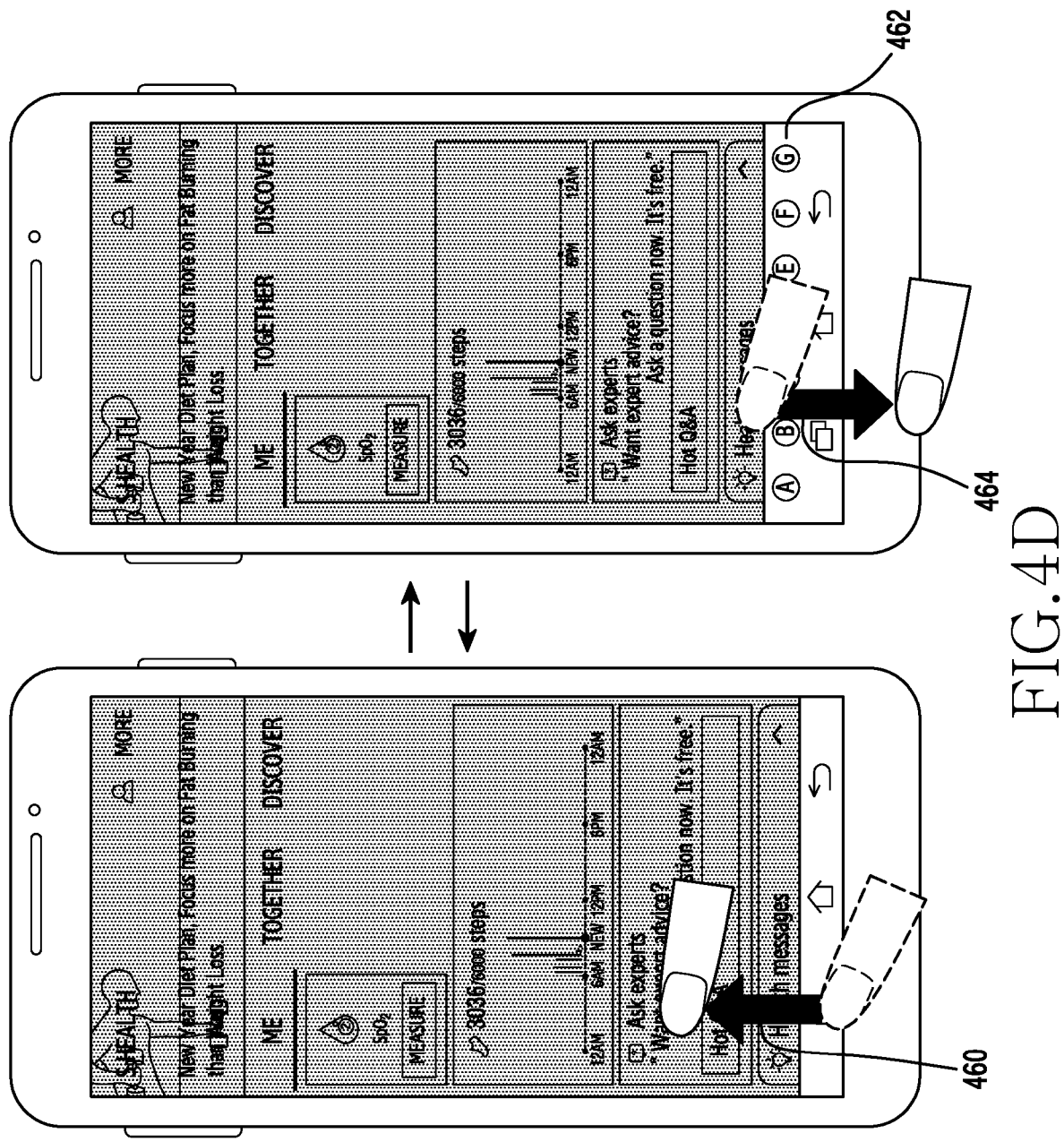
Figure 4E:
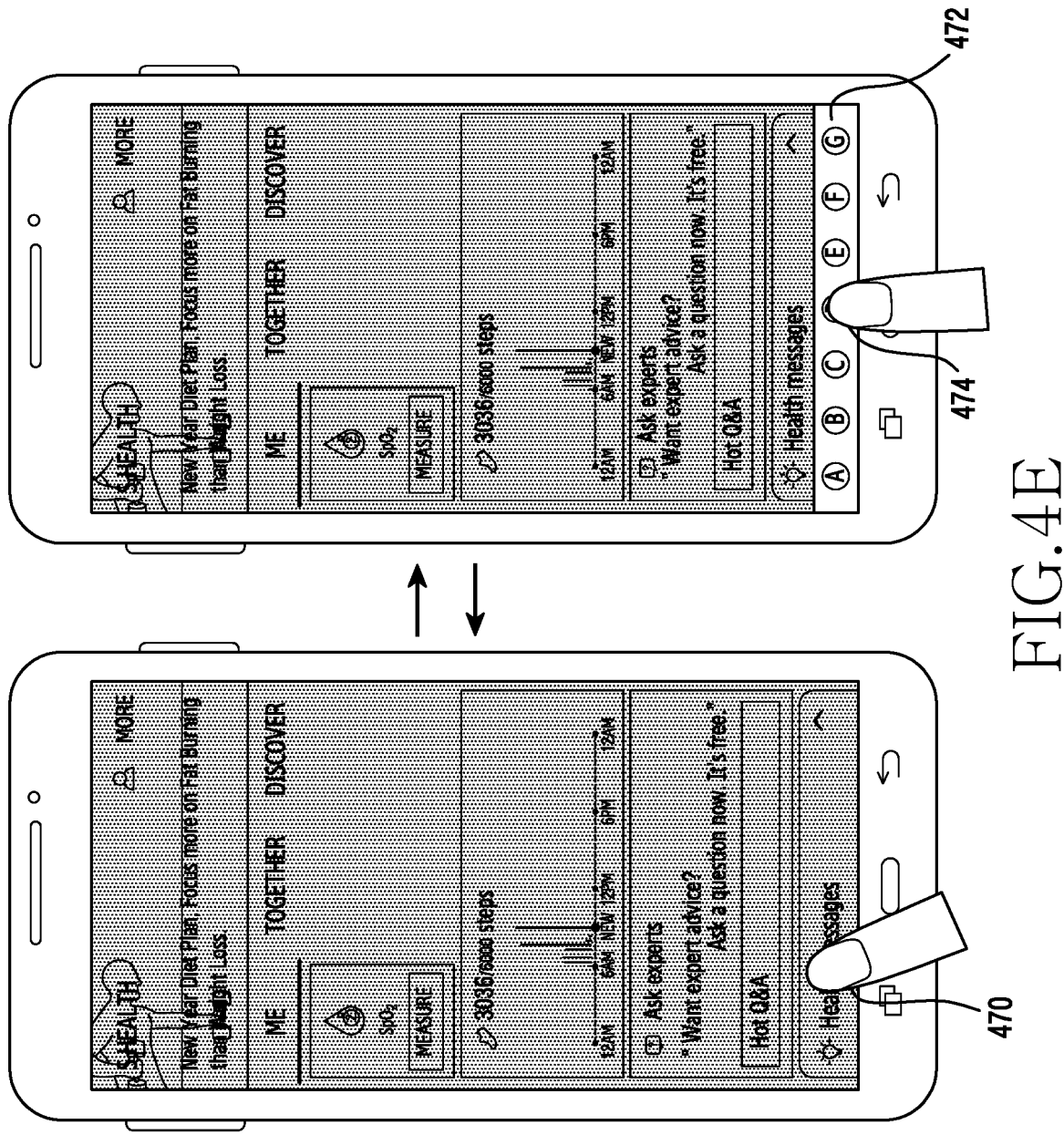

As a further, example referring to FIG. 4C, when a touch motion input (e.g., swipe input) 450 in a direction from a bezel area to the display 160 is detected, the processor 120 determines that an event for displaying an application switch object has occurred; or referring to FIG. 4D, when a touch motion input (e.g., swipe input) 460 in a direction from a bezel area to the display 160 is detected, the processor 120 determines that an event for displaying an application switch object has occurred. As another example referring to FIG. 4E, when pressure input 470 is detected in a predefined area of the display 160, the processor 120 determines that an event for displaying an application switch object has occurred; or referring to FIG. 4F, when pressure input 480 is detected in a predefined area of the display 160, the processor 120 determines that an event for displaying an application switch object has occurred. The predefined area in FIG. 4E is an area for displaying an application switch object, and an area where the software button 430 is displayed in FIG. 4F.

In operation 307, the electronic device displays an application switch object in at least a portion of the display, in response to the occurrence of the event in operation 305, along with the application execution information. For example, referring to FIG. 4A, when the selection input 418 of the recent key 416 is detected, the processor 120 controls the display 160 to display application switch object 420 in a bottom portion of the display with the service screen 400 of the exercise/health application; or referring to FIG. 4B, when the selection input 438 of the recent key 436 is detected, the processor 120 controls the display 160 to display application switch object 440 in a bottom portion of the display with the service screen 400 of the exercise/health application.

As a further example, referring to FIG. 4C, when the touch motion input (e.g., swipe input) 450 in the direction from the bezel area to the display 160 is detected, the processor 120 controls the display 160 to display application switch object 452 in a bottom portion of the display 160 with the service screen 400 of the exercise/health application; or referring to FIG. 4D, when the touch motion input (e.g., swipe input) 460 in the direction from the bezel area to the display 160 is detected, the processor 120 controls the display 160 to display application switch object 462 in a bottom portion of the display 160 with the service screen 400 of the exercise/health application. As another example, referring to FIG. 4E, when the pressure input 470 is detected in a predefined area of the display 160, the processor 120 controls the display 160 to display application switch object 472 in a bottom portion of the display 160 with the service screen 400 of the exercise/health application; or referring to FIG. 4F, when the pressure input 480 is detected in a predefined area of the display 160, the processor 120 controls the display 160 to display application switch object 482 in a bottom portion of the display 160 with the service screen 400 of the exercise/health application.

As shown in FIG. 4A, the application switch object 420 includes, in order, software buttons A, B, and C for an application usage history 422 of the electronic device, software button D for executed application information 424, and software buttons E, F, and G for recommended applications 426. In one embodiment, the display 160 adjusts graphic parameters differently such that the application usage history 422, the executed application information 424, and the recommended application 426 are visually distinguishable from each other. The graphic parameters may include, for example, at least one of a spatial position, a size, a shape, the brightness of a color, hue, chrominance or "chroma", a pattern, an orientation, and an arrangement.

Figure 4F:
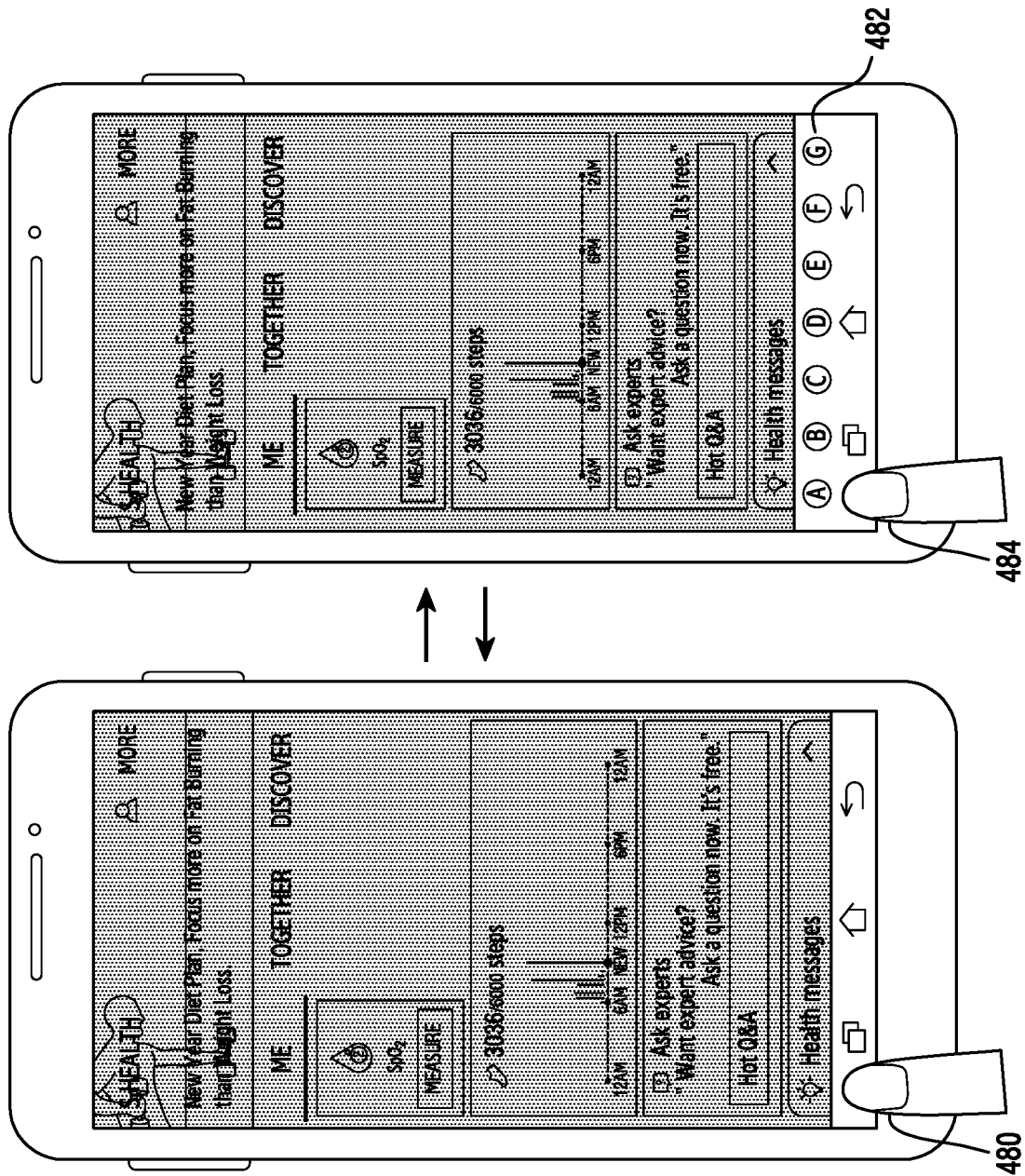

According to one embodiment, the application switch object is displayed in a portion of the display 160 until an elimination event occurs. For example, referring to FIG. 4A, when selection input 408 of the recent key 416 is detected, the processor 120 determines that an event for eliminating application switch object 420 has occurred; referring to FIG. 4B, when selection input 442 of the recent key 436 is detected, the processor 120 determines that an event for eliminating application switch object 440 has occurred. In a further example, referring to FIG. 4C, when a touch motion input (e.g., swipe input) 454 is detected in a direction from the display 160 to the bezel area, the processor 120 determines that an event for eliminating application switch object 452 has occurred; or, referring to FIG. 4D, when a touch motion input (e.g., swipe input) 464 in a direction from the display 160 to the bezel area is detected, the processor 120 determines that an event for eliminating application switch object 462 has occurred. As an additional example, referring to FIG. 4E, when pressure input 474 is detected in a predefined area of the display 160, the processor 120 determines that an event for eliminating application switch object 472 has occurred; referring to FIG. 4F, when pressure input 484 is detected in a predefined area of the display 160, the processor 120 determines that an event for eliminating application switch object 482 has occurred. The predefined area may be, for example, an area in the application switch object, as illustrated in FIG. 4E, and/or a software button, as illustrated in FIG. 4F.

Figure 5:
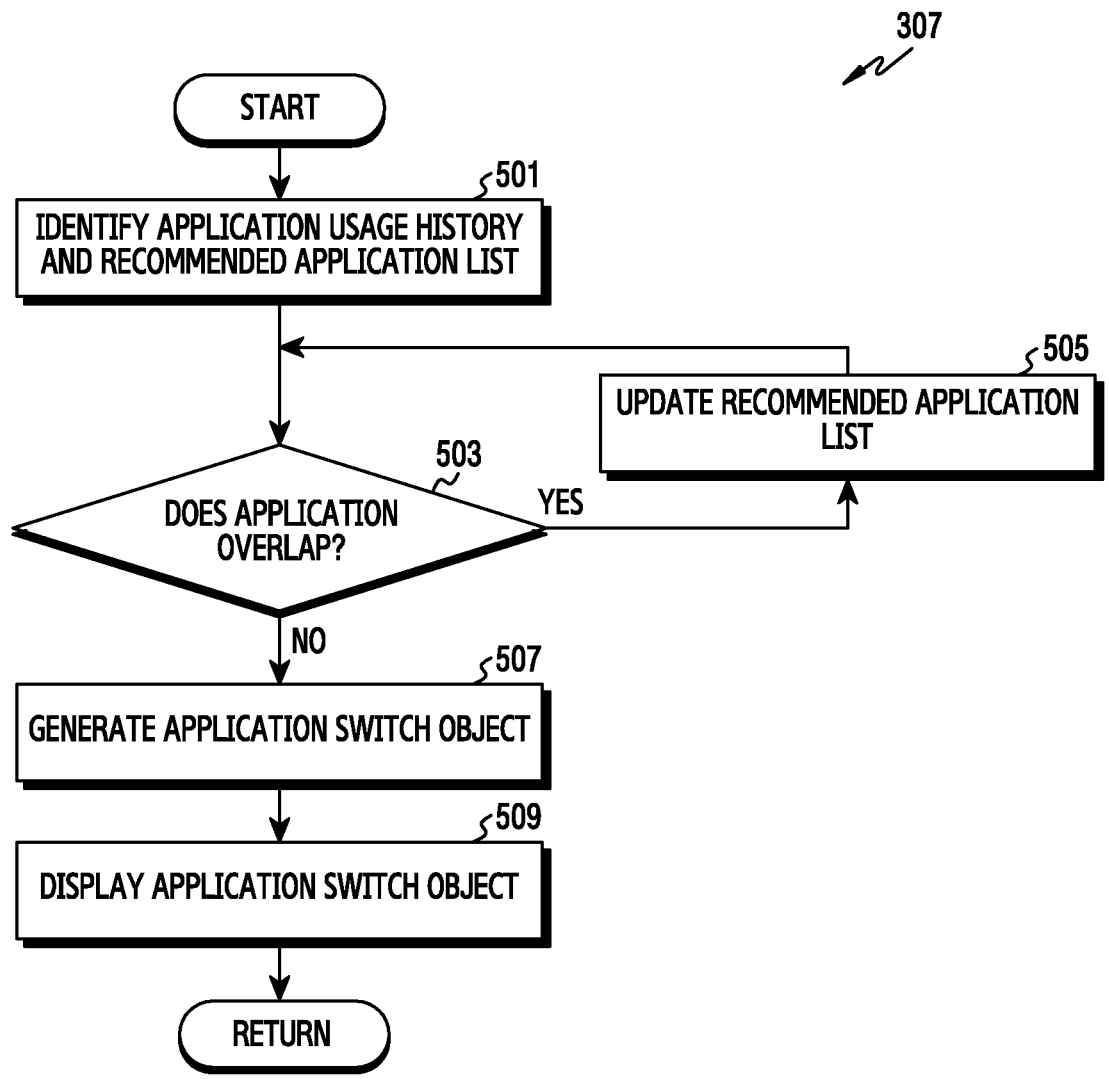
FIG. 5 is a flowchart illustrating a method by which an electronic device configures an application switch object according to various embodiments of the present disclosure.

FIG. 5 is a flowchart illustrating a method by which an electronic device configures an application switch object according to various embodiments of the present disclosure. This method corresponds to the operation of displaying an application switch object, mentioned in operation 307 of FIG. 3. In the following description, the electronic device may include the electronic device 101 of FIG. 1, or at least a part (e.g., the processor 120) of the electronic device 101.

In FIG. 5, when an event for displaying an application switch object is detected (e.g., operation 305 in FIG. 3), and, in operation 501, the electronic device identifies an application usage history of the electronic device and a recommended application list. For the application usage history, the processor 120 may identify at least one application that has been executed most recently from information on applications executed in the electronic device 101, which is stored in the memory 130 of the electronic device 101. For the recommended application list, the processor 120 may identify at least one recommended application associated with an application (e.g., an exercise application) running on the electronic device 101. For example, a recommended application associated with the running application may be determined based on the number of times another application was executed after the execution of the running application and/or the execution time of the other application.

In operation 503, the electronic device identifies whether there is an overlapping application belonging to both the application usage history and the recommended application list. For example, the processor 120 may identify whether there is an application included in both the application usage history and the recommended application list.

When there is an overlapping application belonging to both the application usage history and the recommended application list in operation 503, the electronic device updates the recommended application list in operation 505. For example, the processor 120 may change the overlapping application to be the application of highest priority among the recommended applications.

When there is no overlapping application belonging to both the application usage history and the recommended application list in operation 503 or after the recommended application list is updated in operation 505, the electronic device generates an application switch object including the application usage history and the recommended application list (or updated recommended application list) in operation 507. For example, referring to FIG. 4A, the processor 120 may generate an application switch object including, in order, the application usage history 422, the executed application information 424, and the recommended application list 426.

In operation 509, the electronic device displays the application switch object in at least a portion of a display along with the already displayed application execution information. The application switch object may be displayed overlapping at least part of a service screen of a running application. Alternatively, the processor 120 may reduce the size of the service screen of the running application displayed on the display 160 and display the application switch object in the area opened by the reduction of the service screen.

Figure 6:
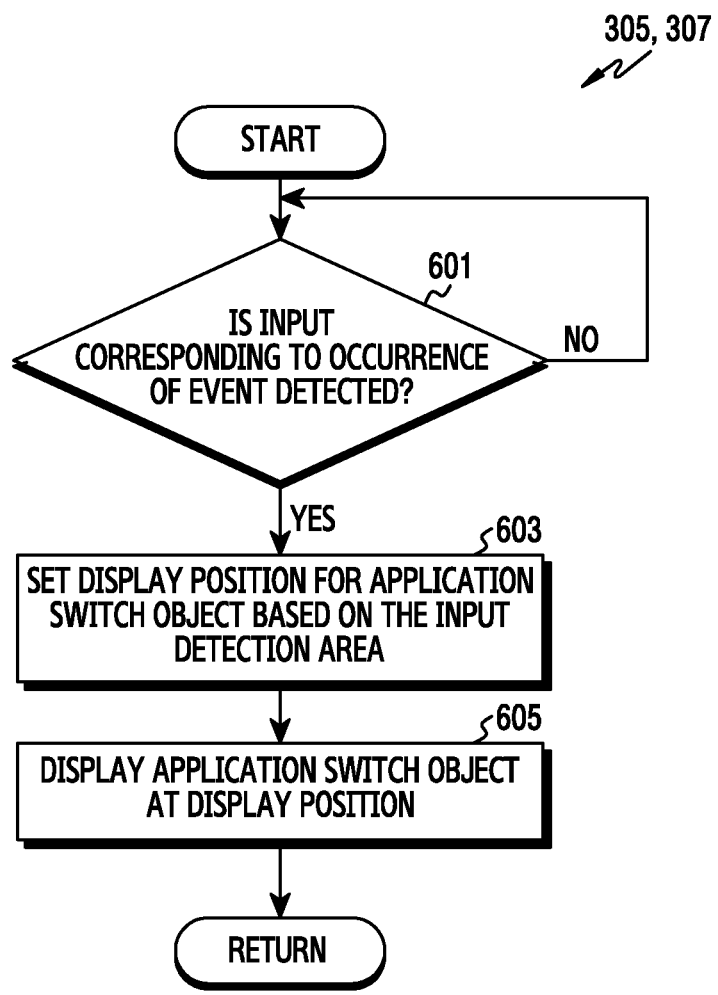
FIG. 6 is a flowchart illustrating a method by which an electronic device determines a position for displaying an application switch object according to various embodiments of the present disclosure.
Figure 7A:
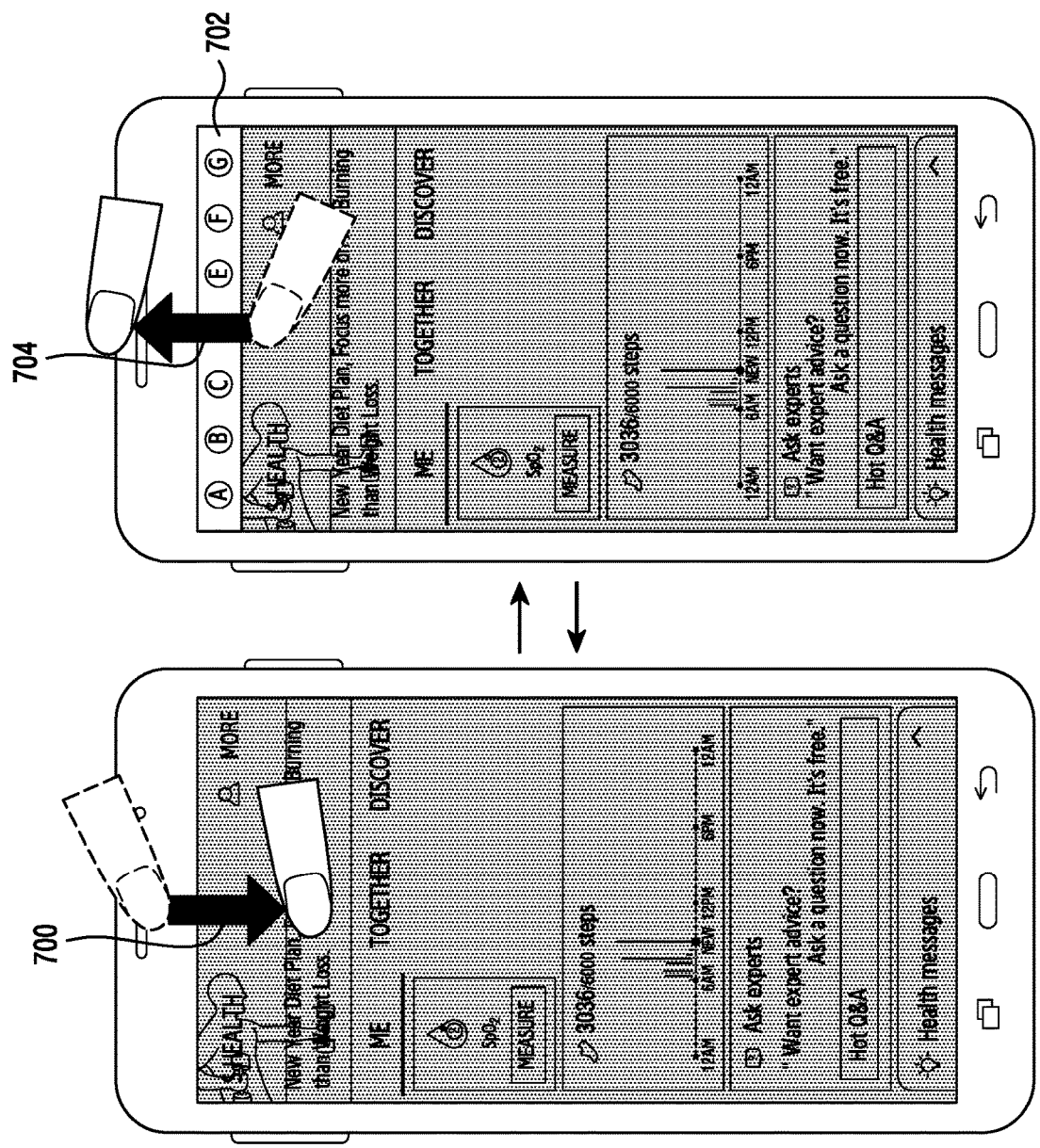
FIGS. 7A and 7B are diagrams illustrating the configuration of a screen displaying an application switch object in an electronic device according to various embodiments of the present disclosure.
Figure 7B:
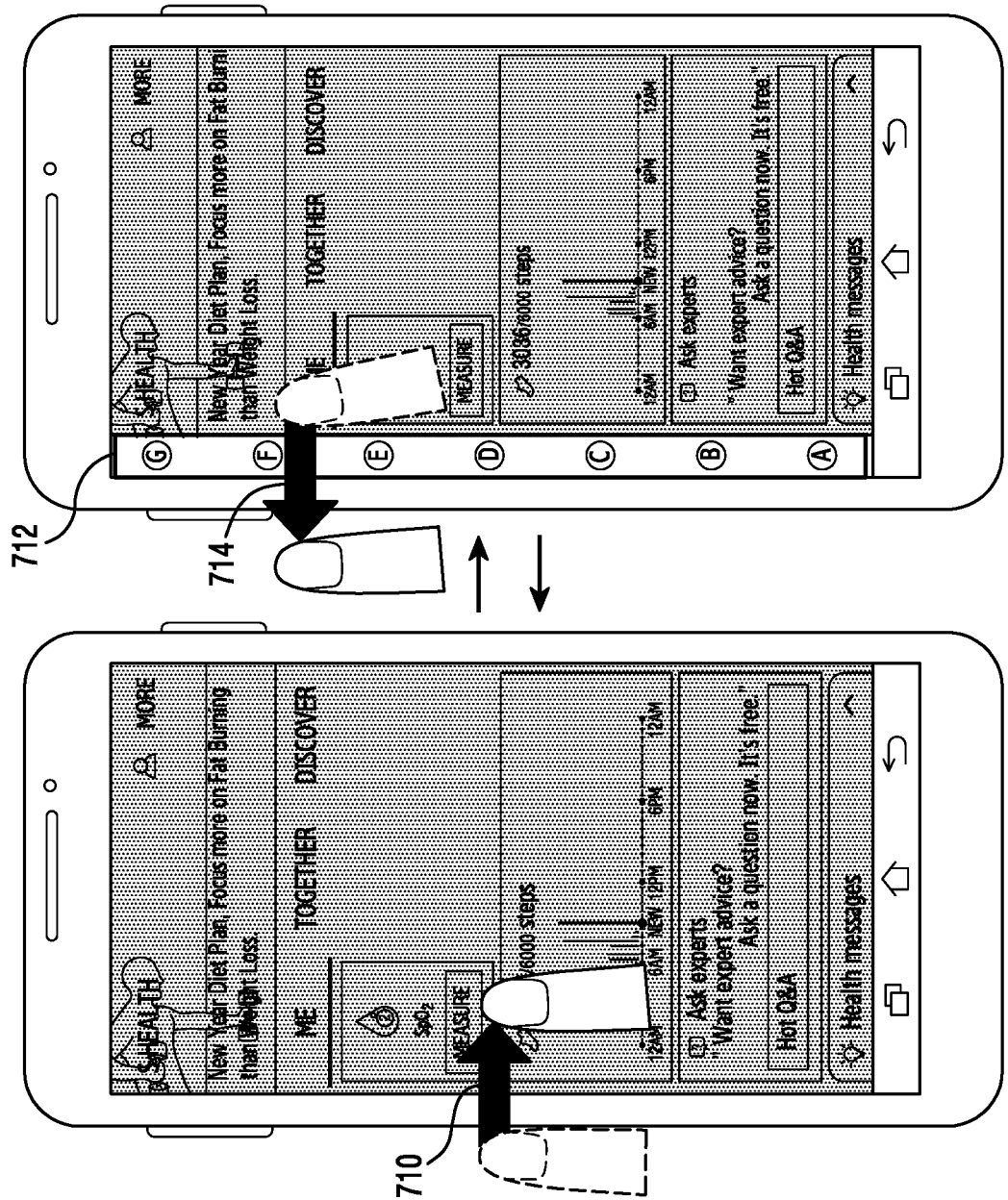

FIG. 6 is a flowchart illustrating a method by which an electronic device determines a position for displaying an application switch object according to various embodiments of the present disclosure. FIGS. 7A and 7B are diagrams which illustrate the configuration of a screen displaying an application switch object in an electronic device according to various embodiments of the present disclosure. The operations in FIG. 6 correspond to operations concerning the application switch object, mentioned in operations 305 and 307 of FIG. 3. In the following description, the electronic device may include the electronic device 101 of FIG. 1, or at least a part (e.g., the processor 120) of the electronic device 101.

In FIG. 6, when an execution screen of an application is displayed on a display of the electronic device (e.g., operation 303 in FIG. 3), and, in operation 601, the electronic device determines whether an input corresponding to an event for displaying an application switch object is detected. For example, the processor 120 of the electronic device 101 may identify whether a touch motion input (e.g., swipe input) 700 or 710 in a direction from a bezel area to the display 160 is detected, as shown in FIGS. 7A and 7B.

When input corresponding to an event for displaying the application switch object is detected in operation 601, the electronic device determines, based on the input, a display position for the application switch object in operation 603. For example, referring to FIG. 7A, when the touch motion input 700 is detected in an upper area of the electronic device 101, the processor 120 determines to display the application switch object in an upper portion of the display 160. The upper area of the electronic device 101 may include, for example, an area where a receiver (speaker) for outputting sound, such as a counterpart's voice, from the electronic device 101 is disposed. Alternatively, referring to FIG. 7B, when the touch motion input 710 is detected on a left side of the electronic device 101, the processor 120 determines to display the application switch object in a portion on the left side of the display 160.

In operation 605, the electronic device displays the application switch object at the display position determined for the application switch object in operation 603. For example, referring to FIG. 7A, the processor 120 may control the display 160 to display an application switch object 702 in an upper portion of the display 160. Alternatively, as shown in FIG. 7B, the processor 120 may control the display 160 to display an application switch object 712 on a left side of the display 160. The display 160 may display the application switch object by applying an animation effect as if the application switch object appears from the area corresponding to the direction of the touch motion input, such as if the application switch object appeared from the bezel area corresponding to the start of the touch motion input 700 or 710 in FIG. 7A or 7B, respectively.

According to one embodiment, the electronic device may dynamically set the number of objects included in the application switch object to correspond to the size of the area displaying the application switch object.

According to one embodiment, when a touch motion input is detected in the opposite direction of the event for displaying the application switch object, the electronic device may eliminate the application switch object displayed on the display. For example, referring to FIG. 7A, when a touch motion input 704 in a direction from the display 160 to the bezel area is detected, the processor 120 controls the display 160 to eliminate the displayed application switch object 702; or referring to FIG. 7B, when a touch motion input 714 in a direction from the display 160 to the bezel area is detected, the processor 120 controls the display 160 to eliminate the displayed application switch object 712. The display 160 may eliminate the displayed application switch object by applying an animation effect as if the application switch object disappears behind or back into the bezel area corresponding to the direction of the touch motion input, such as if the application switch object disappeared into the bezel area corresponding to the end of the touch motion input 704 or 714 in FIG. 7A or 7B, respectively.

Figure 8:
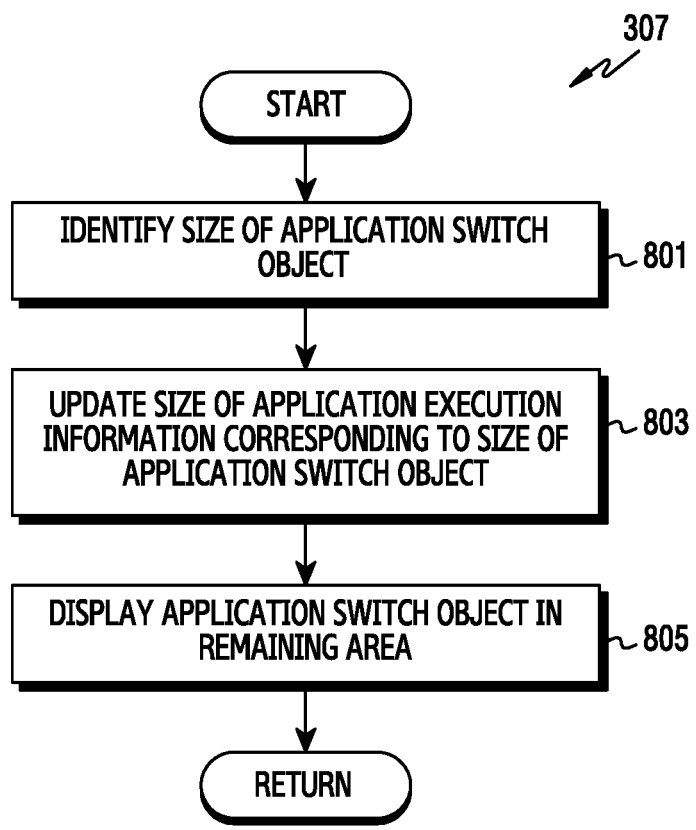
FIG. 8 is a flowchart illustrating a method by which an electronic device determines a display area for an application switch object according to various embodiments of the present disclosure.
Figure 9A:
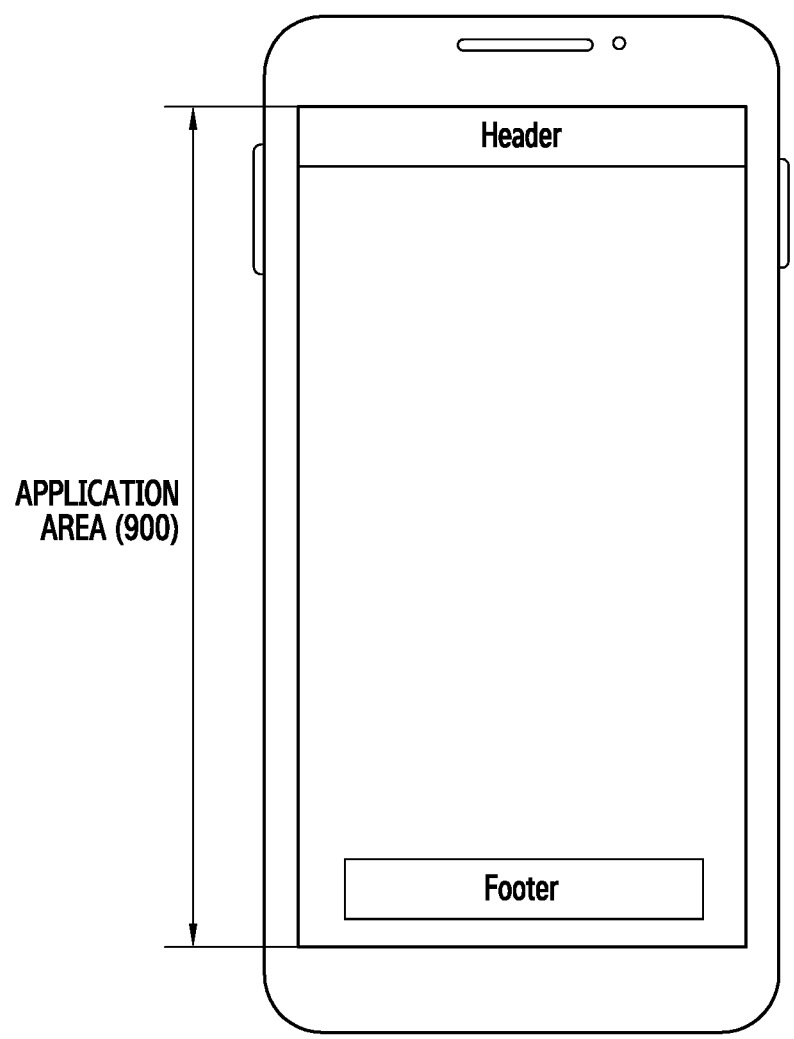
FIGS. 9A and 9B are diagrams illustrating a configuration for determining a display area for an application switch object in an electronic device according to various embodiments of the present disclosure.
Figure 9B:
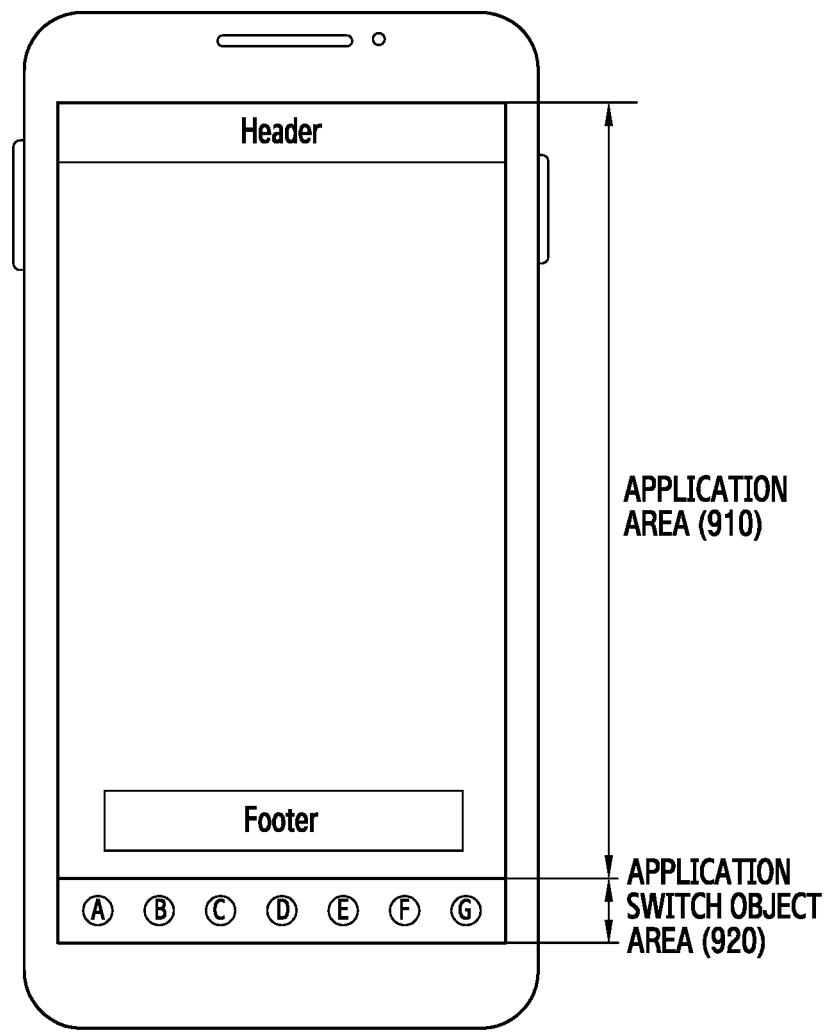

FIG. 8 is a flowchart illustrating a method by which an electronic device determines a display area for an application switch object according to various embodiments of the present disclosure. FIGS. 9A and 9B are diagrams which illustrate a configuration for determining a display area for an application switch object in an electronic device according to various embodiments of the present disclosure. The operations in FIG. 8 correspond to operations of displaying an application switch object, mentioned in operation 307 of FIG. 3. In the following description, the electronic device may include the electronic device 101 of FIG. 1, or at least a part (e.g., the processor 120) of the electronic device 101.

In FIG. 8, when the occurrence of an event for displaying an application switch object is detected (e.g., operation 305 in FIG. 3), and, in operation 801, the electronic device identifies the size of the application switch object to be displayed in the display 160. For example, the processor 120 may check height information for displaying the application switch object from preset configuration parameters for an application switch object, which are stored in the memory 130 of the electronic device 101.

In operation 803, the electronic device updates the size of application execution information already displayed on the display such that the display may also display the application switch object at the size determined in operation 801. For example, when an application is executed, the display 160 may display a service screen of the application, or application area 900, in the entire area of the display 160, as shown in FIG. 9A. When an event for displaying the application switch object is detected, the processor 120 controls the display 160 to reduce the service screen of the application 900 in FIG. 9A to application area 910 in FIG. 9B in order to obtain a display area 920 for the application switch object, as shown in FIG. 9B.

In operation 805, the electronic device displays the application switch object in the empty area obtained by updating/reducing the size of the application execution information in operation 803. For example, the processor 120 controls the display 160 to display the application switch object in the application switch object area 920, as shown in FIG. 9B.

Figure 10:
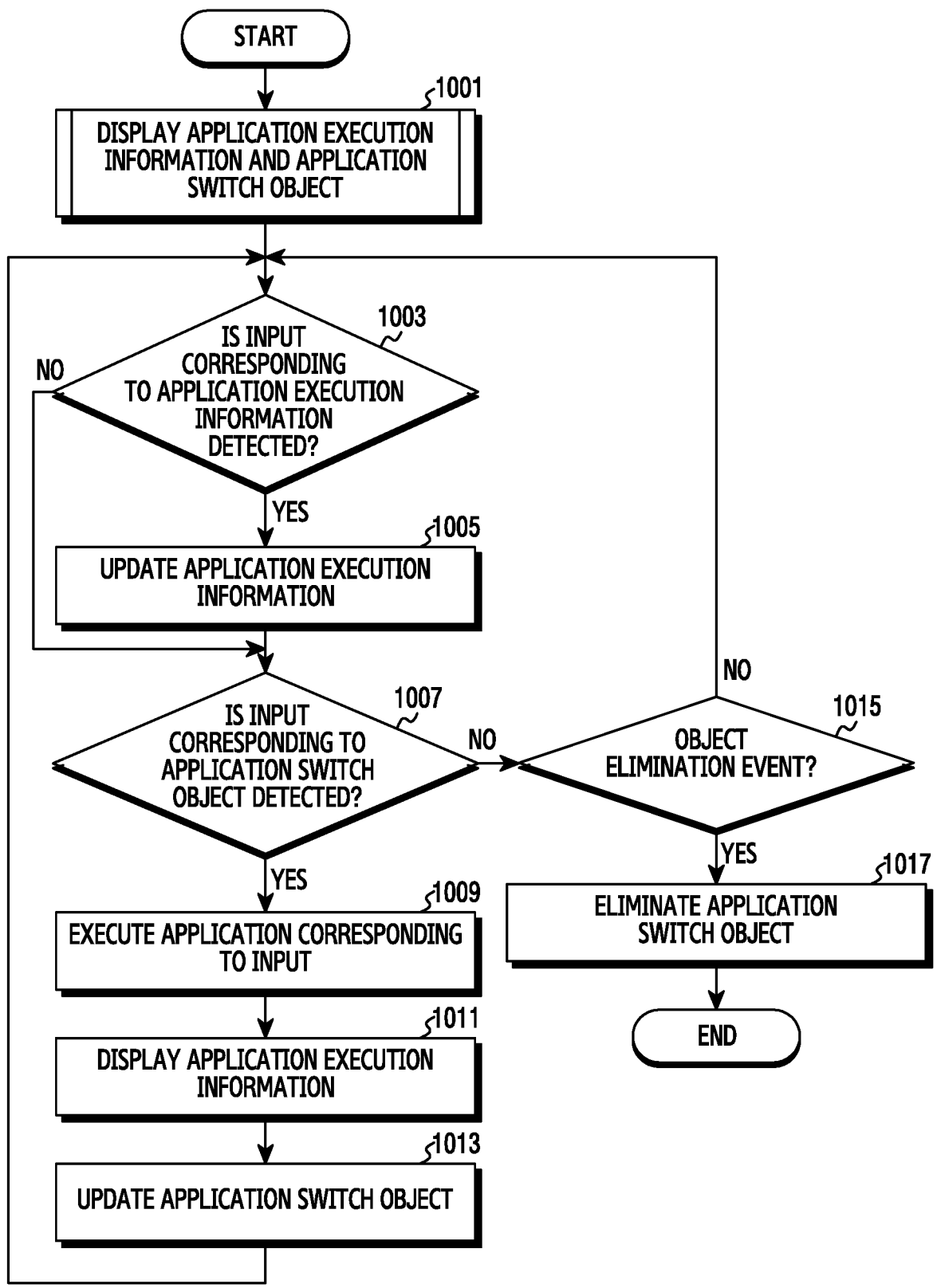
FIG. 10 is a flowchart illustrating a method by which an electronic device controls an application according to various embodiments of the present disclosure.
Figure 11A:
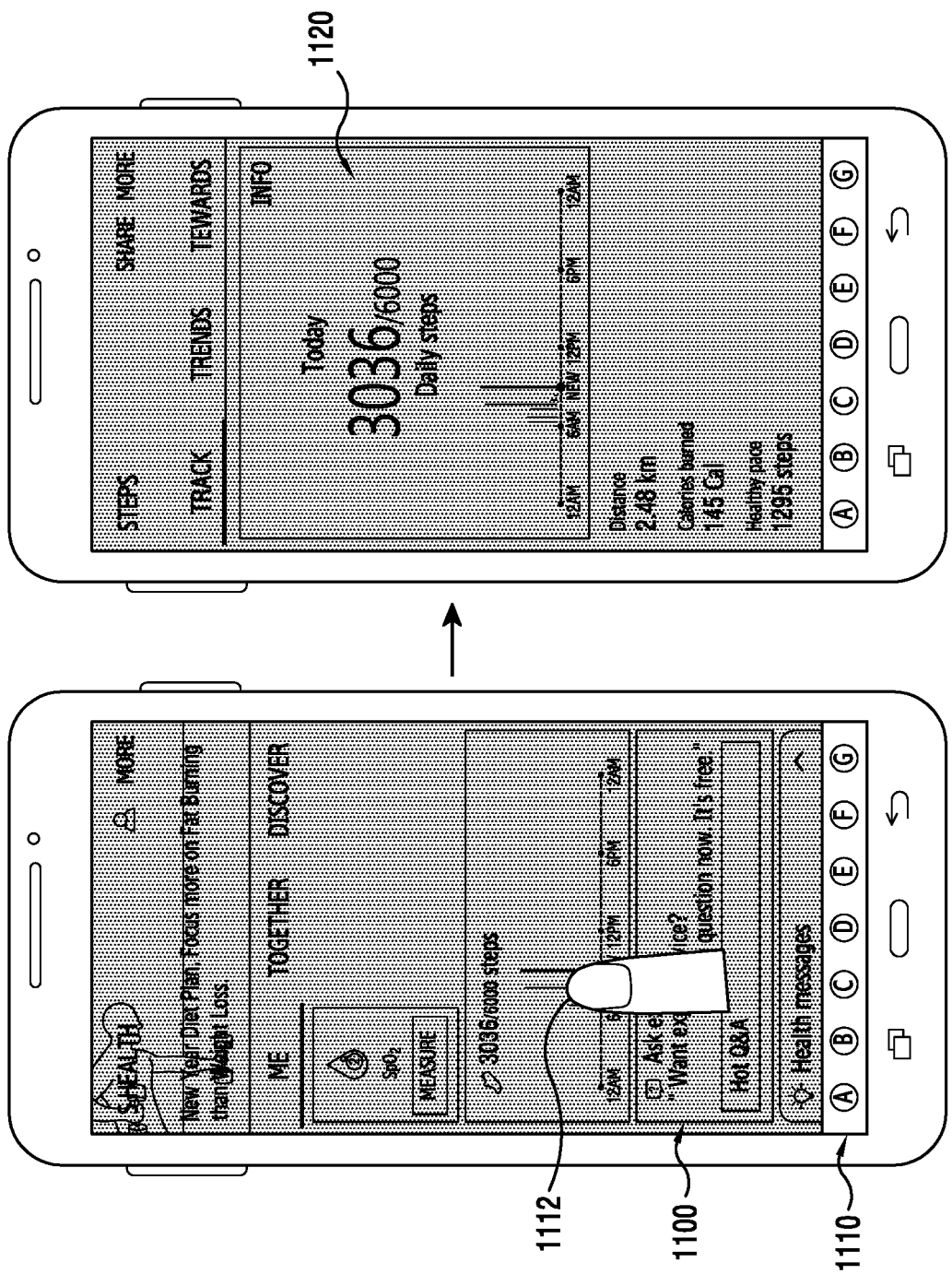
FIGS. 11A and 11B are diagrams illustrating the configuration of a screen for controlling an application in an electronic device according to various embodiments of the present disclosure.
Figure 11B:
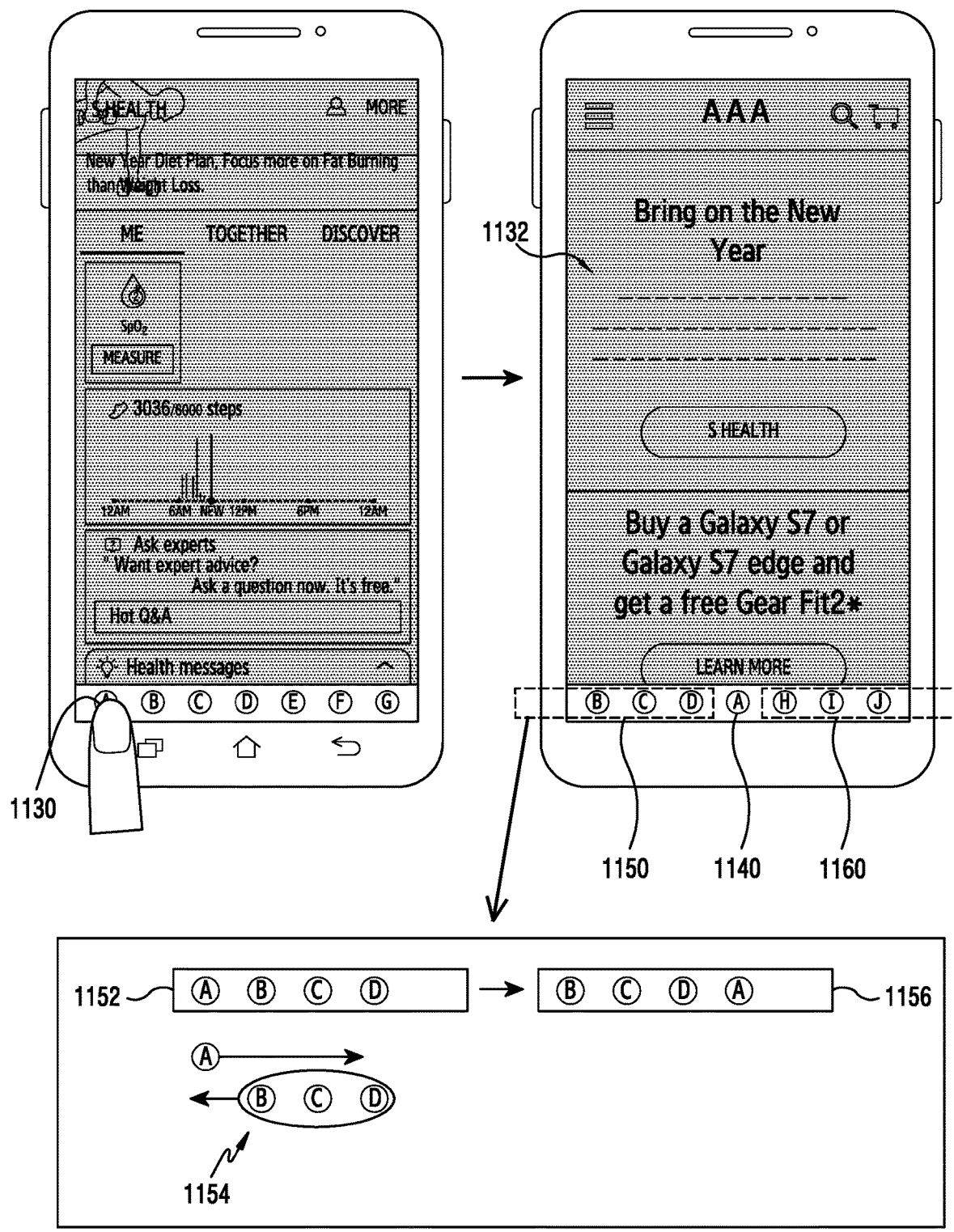

FIG. 10 is a flowchart illustrating a method by which an electronic device controls an application according to various embodiments of the present disclosure. FIGS. 11A and 11B are diagrams which illustrate the configuration of a screen for controlling an application in an electronic device according to various embodiments of the present disclosure. In the following description, the electronic device may include the electronic device 101 of FIG. 1, or at least a part (e.g., the processor 120) of the electronic device 101.

In operation 1001 of FIG. 10, the electronic device displays application execution information and an application switch object on a display. For example, as in operations 301 to 305 of FIG. 3, the processor 120 controls the display 160 to display the application switch object in at least a portion of the display 160 with the application execution information. Specifically, the display 160 may display the application execution information in a first area and may display the application switch object in a second area. The display 160 may display the application switch object to overlap with at least part of the application execution information.

In operation 1003, the electronic device identifies whether an input corresponding to the application execution information is detected. For example, in FIG. 11A, the processor 120 may identify whether a touch input or a pressure input 1112 corresponding to an area of the displayed service screen 1100 of the running exercise/health application is detected through a touch panel or pressure panel.

When no input corresponding to the application execution information is detected in operation 1003, the electronic device identifies whether an input corresponding to the application switch object is detected in operation 1007.

When input corresponding to the application execution information is detected in operation 1003, the electronic device updates the application execution information corresponding to a function mapped to the input area in operation 1005. For example, in FIG. 11A, when a touch input 1112 is detected on the displayed exercise history information in the service screen 1100 of the exercise/health application, the processor 120 controls the display 160 to display detailed information 1120 on exercise history, as shown on the right-hand side of FIG. 11A. Alternatively, when the execution of the exercise application is maintained, the processor 120 may control the display 160 to maintain the configuration and display of the application switch object. That is, the processor 120 may control the display 160 to maintain the configuration and display of the application switch object even though execution information on the exercise application is updated.

In operation 1007, the electronic device determines whether an input corresponding to the application switch object is detected. For example, the processor 120 may identify whether a touch input or a pressure input corresponding to an area where the application switch object 1110 is displayed in FIG. 11A is detected through the touch panel or pressure panel.

When input corresponding to the application switch object is detected in operation 1007, the electronic device executes an application or function corresponding to an object/item associated with the detected input in operation 1009. Specifically, when a touch input corresponding to the display area for the application switch object is detected, the processor 120 identifies an object/item corresponding to the touch input among a plurality of objects/items forming the application switch object. The processor 120 loads execution data on an application corresponding to the object/item associated with the detected touch input from, for example, the memory 130 onto the drive buffer of the processor 120.

In operation 1011, the electronic device displays execution information on the application executed in operation 1009 corresponding to the object/item associated with the detected input on the display in operation 1007. For example, referring to FIG. 11B, when a touch input 1130 of object A corresponding to a web browser is detected, the processor 120 controls the display 160 to display a service screen 1132 of the web browser. In FIG. 11B, the display 160 changes a service screen 1112 of the exercise application being displayed on the left-hand side of FIG. 11B to the service screen 1132 of the web browser being displayed on the right-hand side of FIG. 11B.

In operation 1013, the electronic device updates the application switch object corresponding to a change of application running on the electronic device in operations 1009 and 1011. For example, referring to FIG. 11B, when the web browser corresponding to object A is executed and displayed, the processor 120 changes the component portions of the application switch object, i.e., the application usage history 1150, the executing application information 1140, and the recommended applications list 1160. The executing application information 1140 of the application switch object changes to object A, and the application usage history 1150 changes from (A, B, C, D) 1152 to (B, C, D, A) 1156 by moving up (B,C,D) 1154 and putting A at the end. Further, when the web browser corresponding to object A is executed, the recommended applications list 1160 of the application switch object is updated from (E,F,G) to be the recommended applications associated with the web browser (H, I, J).

When no input corresponding to the application switch object is detected in operation 1007, the electronic device determines whether an event for eliminating an application switch object has occurred in operation 1015. For example, the processor 120 may identify whether an input from a button (e.g., the recent keys 416 and 436 in FIGS. 4A and 4B) matched to an event for eliminating an application switch object is detected while the application switch object displayed. When selection input of the button matched to an event for eliminating an application switch object is detected, the processor 120 determines that an event for eliminating an application switch object has occurred. For example, the event for eliminating an application switch object may be a touch motion input (e.g., the swipe input 454 and 464 in FIGS. 4C and 4D) from the display 160 to the bezel area or a pressure input (e.g., the pressure input 474 and 454 in FIGS. 4E and 4F) in a predefined area. The predefined area may include, for example, at least one of a display area for the application switch object and an a display area for a software button.

When no event for eliminating an application switch object occurs in operation 1015, the electronic device returns again to operation 1003 to determine whether an input corresponding to the application execution information is detected. If an event for eliminating an application switch object occurs in operation 1015, the electronic device 101 eliminates the application switch object operation 1017 and the method ends.

Figure 12:
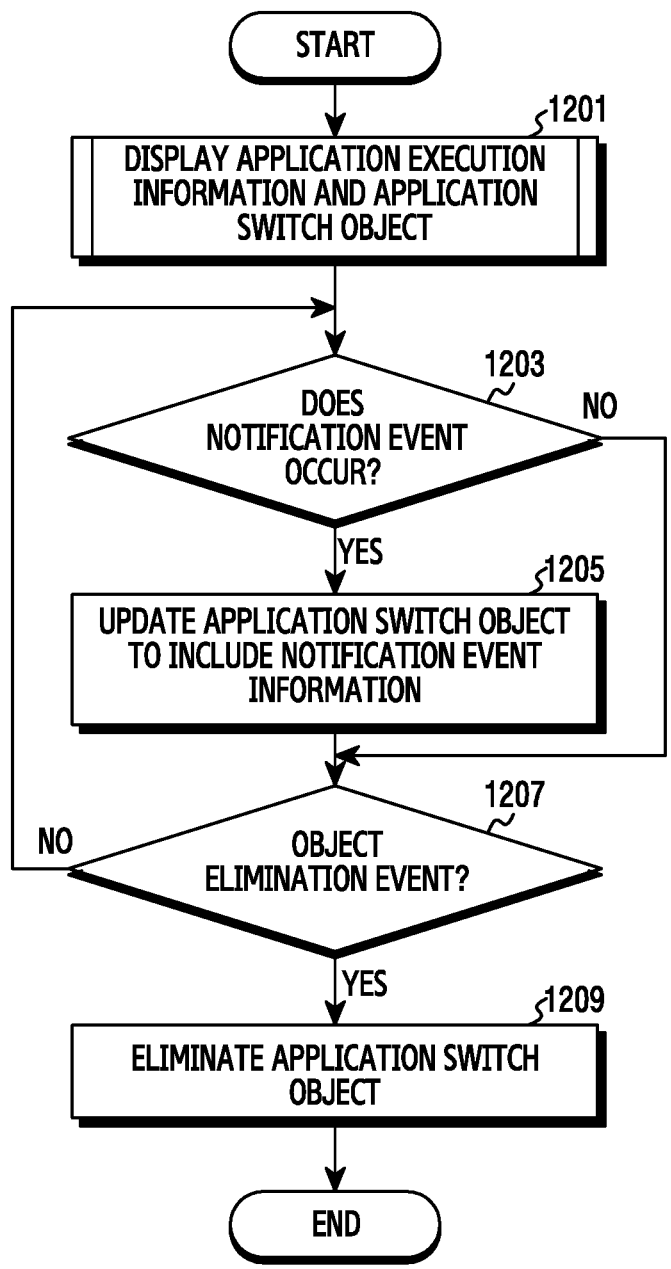
FIG. 12 is a flowchart illustrating a method by which an electronic device updates an application switch object based on notification information according to various embodiments of the present disclosure.
Figure 13:
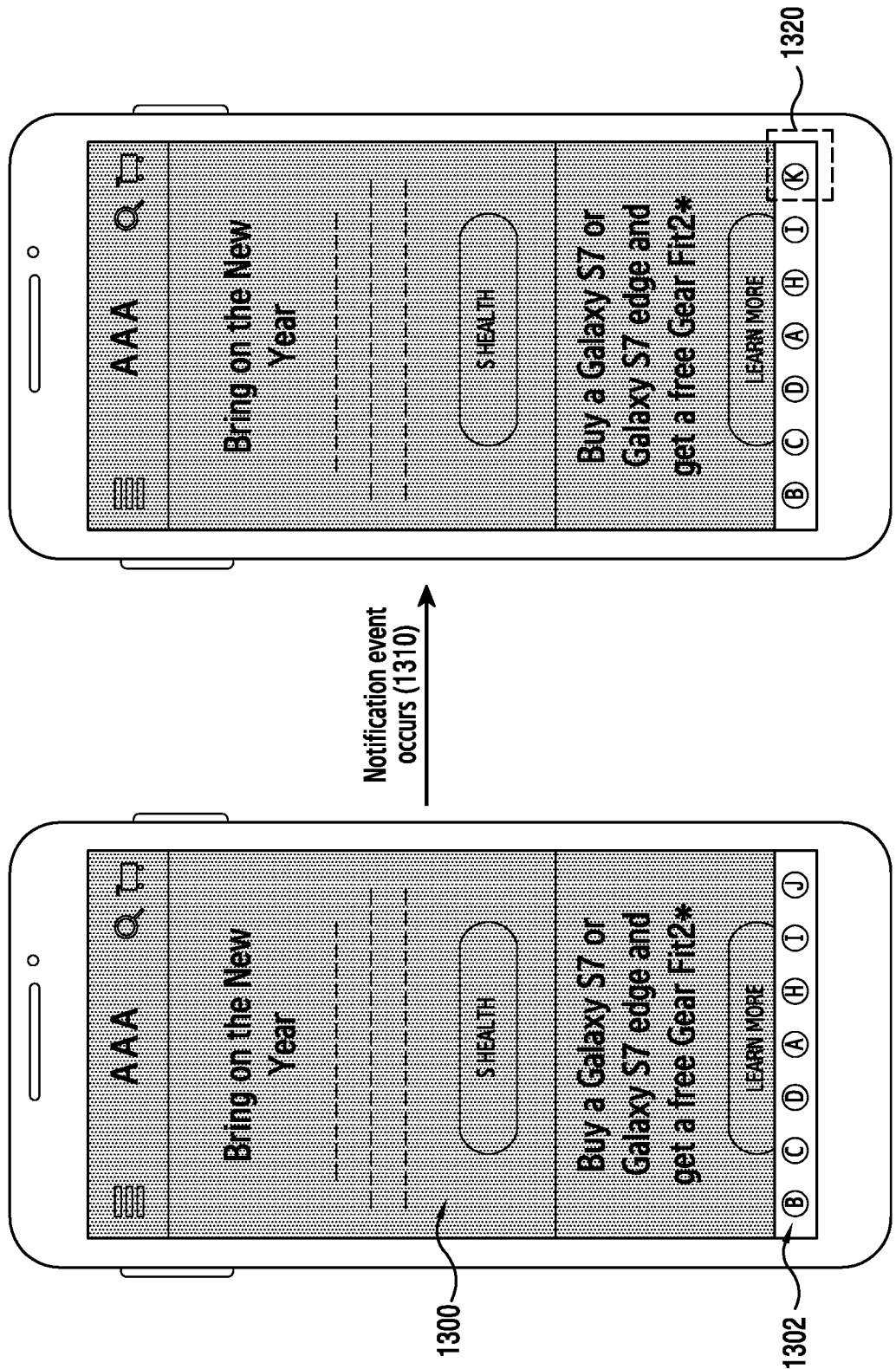
FIG. 13 is a diagram which illustrates the configuration of a screen for updating an application switch object based on notification information in an electronic device according to various embodiments of the present disclosure.

FIG. 12 is a flowchart illustrating a method by which an electronic device updates an application switch object based on notification information according to various embodiments of the present disclosure. FIG. 13 is a diagram which illustrates the configuration of a screen for updating an application switch object based on notification information in an electronic device according to various embodiments of the present disclosure. In the following description, the electronic device may include the electronic device 101 of FIG. 1, or at least a part (e.g., the processor 120) of the electronic device 101.

In operation 1201 of FIG. 12, the electronic device displays application execution information and an application switch object on a display functionally connected with the electronic device. For example, as in operations 301 to 305 of FIG. 3, the processor 120 of the electronic device 101 may control the display 160 to display the application switch object in at least a portion of the display along with the application execution information. Specifically, referring to FIG. 13, the processor 120 controls the display 160 to display the service screen 1300 of the web browser along with an application switch object 1302 displayed in a bottom portion of the display 160. The application switch object 1302 may include, for example, at least one recommended application associated with the web browser. For instance, the at least one recommended application associated with the web browser may be determined based on at least one of the number of execution times of at least one application executed after the execution of the web browser at the previous time and the execution time of the other application. Alternatively, the at least one recommended application associated with the web browser may be determined based on user input (selection input) corresponding to an application list.

In operation 1203, the electronic device identifies whether a notification event occurs. The notification event may be, for example, at least one event, the occurrence of which the user needs to recognize, such as a notification that a certain time has come, the reception of a message, and the reception of a call.

When the notification event occurs, as detected in operation 1203, the electronic device updates the application switch object to include notification event information in operation 1205. For example, referring to FIG. 13, when a notification event occurs (1310) with the service screen 1300 of the web browser and the application switch object 1302 displayed (as shown on the left-hand side of FIG. 13), the processor 120 identifies an application corresponding to the notification event and updates the recommended applications list of the application switch object to include the application corresponding to the notification event. Specifically, the processor 120 finds application K corresponding to the notification event and selects a recommended application of a relatively low priority in the recommended applications list to be changed to the application K corresponding to the notification event. Accordingly, the display 160 changes object/icon J of an application of the lowest priority on the recommended applications list to object/icon K 1320 of the application corresponding to the notification event. The object of the application corresponding to the notification event may include, for example, the number of notification events that have occurred.

In operation 1207, the electronic device determines whether an event for eliminating an application switch object occurs. For example, the processor 120 may identify whether at least one of a button input, a touch motion input, and a pressure input matched with an event for eliminating an application switch object is detected.

When no event for eliminating the application switch object occurs at operation 1207, the electronic device returns again to operation 1203 to determine whether a notification event occurs. If an event for eliminating the application switch object occurs at operation 1207, the electronic device eliminates the application switch object at operation 1209 and the method ends.

According to one embodiment, when a plurality of notification events occurs with the application execution information and the application switch object displayed, the electronic device may update the application switch object to include a representative application among a plurality of applications corresponding to the plurality of notification events. For example, the processor 120 may select a representative application to be added to the application switch object based on the priorities set on the basis of at least one of the attributes of the notification events, the occurrence time of the notification events, the number of execution times of applications corresponding to the notification events, the execution time of the applications, the execution frequency of the applications, and/or priorities set by user input. The processor 120 selects at least one application for outputting a notification event based on the priority of at least one remaining application other than the representative application among the plurality of applications corresponding to the notification events. For example, the processor 120 may perform control to output a notification event of an application of a relatively high priority. Specifically, the processor 120 may control the display to display an icon corresponding to the notification event of an application of relatively high priority on a notification bar displayed in at least a portion of the display. The processor 120 may perform control to generate at least one of vibration and sound corresponding to the notification event of the application of relatively high priority. For example, regarding the plurality of notification events, the plurality of notification events may successively occur or a notification event may subsequently occur before the previous notification event is identified by a user.

According to one embodiment, when a plurality of notification events occurs with the application execution information and the application switch object displayed, the electronic device may update the application switch object to include at least one application among a plurality of applications corresponding to the plurality of notification events. For example, when two notification events occur, the processor 120 may change two applications of relatively low priorities among recommended applications in the recommended applications list included in the application switch object to applications corresponding to the notification events. In one embodiment, when there are more applications corresponding to notification events than recommended applications which can fit in the recommended applications list included in the application switch object, the processor 120 may compare the priorities of the recommended applications with those of the applications corresponding to the notification events and may select at least one application of a relatively higher priority corresponding to a notification event. Alternatively, the processor 120 may select at least one application for outputting a notification event based on the priority of at least one remaining application not included in the application switch object among the plurality of applications corresponding to the notification events.

Figure 14:
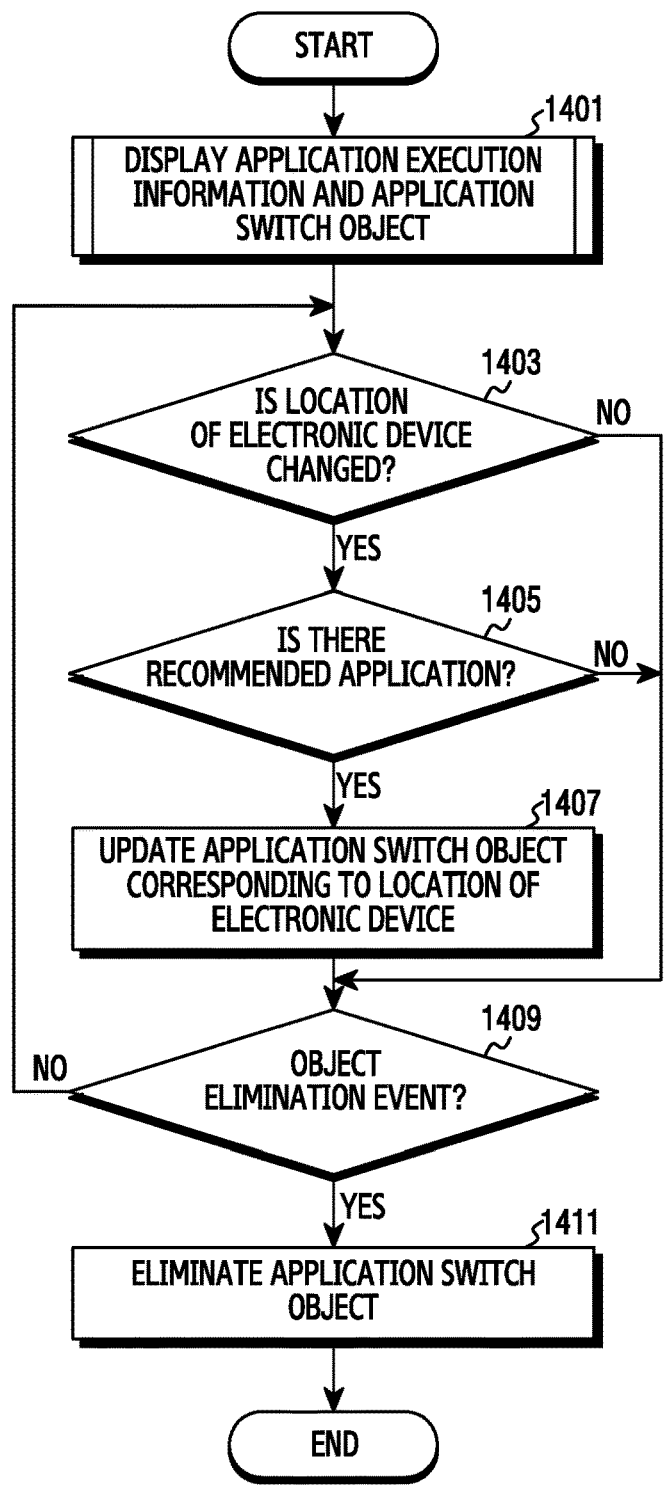
FIG. 14 is a flowchart illustrating a method by which an electronic device updates an application switch object based on location information according to various embodiments of the present disclosure.
Figure 15:
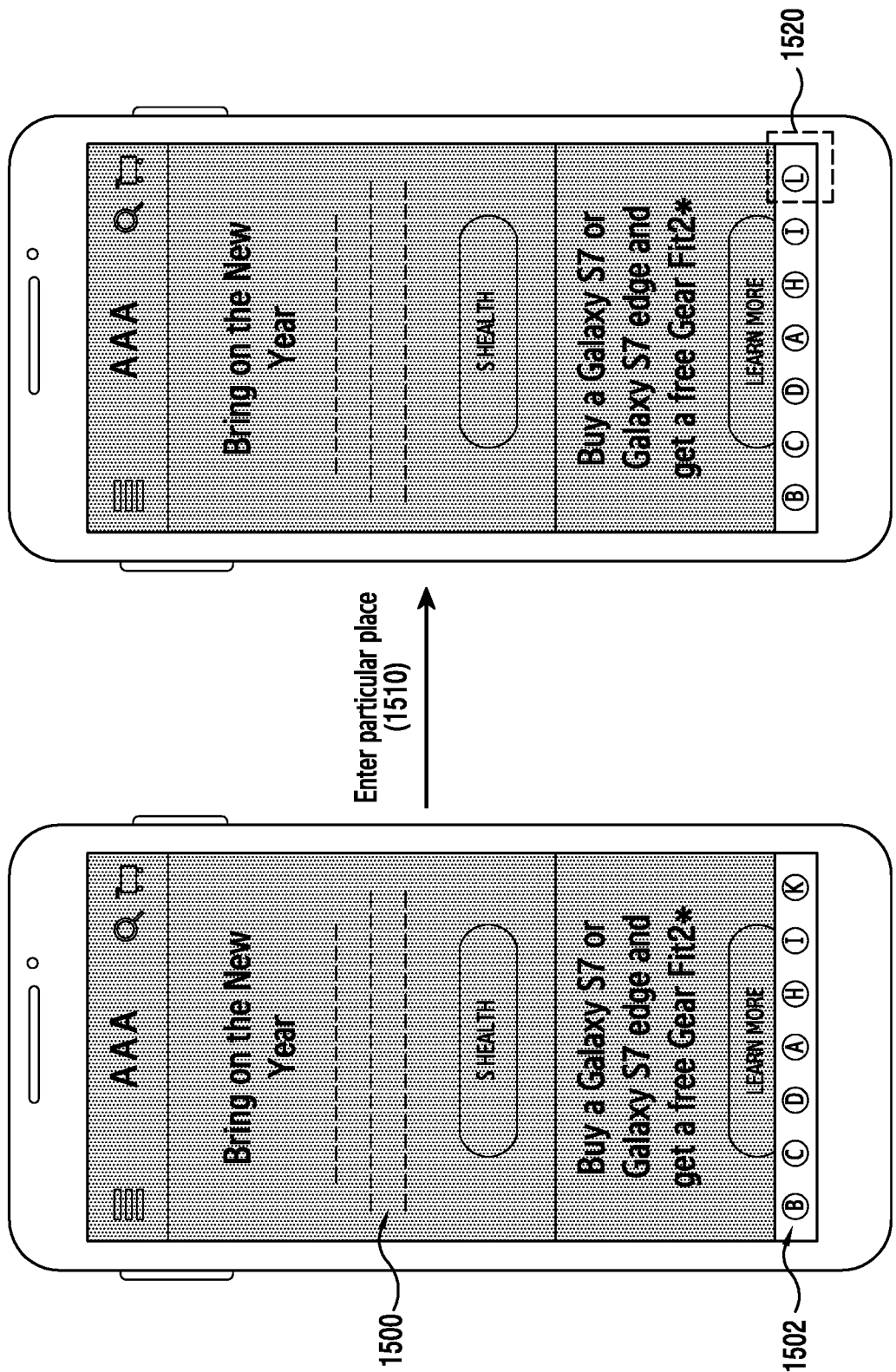
FIG. 15 is a diagram which illustrates the configuration of a screen for updating an application switch object based on location information in an electronic device according to various embodiments of the present disclosure.

FIG. 14 is a flowchart illustrating a method by which an electronic device updates an application switch object based on location information according to various embodiments of the present disclosure. FIG. 15 is a diagram which illustrates the configuration of a screen for updating an application switch object based on location information in an electronic device according to various embodiments of the present disclosure. In the following description, the electronic device may include the electronic device 101 of FIG. 1, or at least a part (e.g., the processor 120) of the electronic device 101.

In operation 1401 of FIG. 14, the electronic device displays application execution information and an application switch object in a display. For example, the processor 120 may control the display 160 to display application execution information in a first area of a display and may display an application switch object in a second area. For example, in FIG. 15, an application switch object 1502 is displayed in a bottom portion of the display 160 with the service screen 1500 of the web browser displayed on most of the display. The application switch object may include, for example, at least one of a recommended application associated with the web browser, an application corresponding to a notification event, and a recommended application associated with the location of the electronic device 101.

In operation 1403, the electronic device determines whether the location of the electronic device has changed. The electronic device may identify the place or region where the electronic device is located based on location information estimated by a location estimation module.

When the location of the electronic device is changed, as determined in operation 1403, the electronic device identifies whether there is a recommended application associated with the location of the electronic device in operation 1405. For example, the processor 120 may identify whether there is an application associated with the location (e.g., the place) of the electronic device 101 among the recommended applications stored in the memory 130. The recommended application associated with the location of the electronic device 101 may include, for example, at least one application of a relatively high priority among at least one application that has been executed at the current location of the electronic device. A priority may be determined, for example, based on at least one of application execution numbers, application execution frequency, and application execution time.

When the location of the electronic device is not changed in operation 1403 or there is no recommended application associated with the changed location of the electronic device in operation 1405, the electronic device determines whether an event for eliminating an application switch object occurs in operation 1409.

When there is a recommended application associated with the location of the electronic device in operation 1405, the electronic device updates the application switch object to include the recommended application associated with the location of the electronic device in operation 1407. For example, referring to FIG. 15, when the electronic device 101 enters a place/location (1510), the processor 120 selects an application corresponding to the place/location to be listed among the recommended applications of the application switch object 1502. The processor 120 selects at least one recommended application of a relatively low priority among the recommended applications of the application switch object 1502 and replaces the at least one selected recommended application with the recommended application associated with the location of the electronic device 101. Specifically, the processor 120 controls the display to change object/icon K of the selected recommended application of the lowest priority among the plurality of recommended applications included in the application switch object 1502 (as shown on the left-hand side of FIG. 15) to object L 1520 of the recommended application associated with the location of the electronic device 101 (as shown on the right-hand side of FIG. 15).

In operation 1409, the electronic device determines whether an event for eliminating an application switch object occurs. For example, the processor 120 may identify at least one of a button input, a touch motion input, and a pressure input matched with an event for eliminating an application switch object is detected.

When no event for eliminating an application switch object occurs, as determined in operation 1409, the electronic device returns again to determine whether the location of the electronic device is changed in operation 1403. If an event for eliminating an application switch object occurs, as determined in operation 1409, the application switch object is eliminated in operation 1411 and the method ends.

According to one embodiment, the electronic device may also change the plurality of recommended applications included in the application switch object to a plurality of recommended applications associated with the location of the electronic device.

Figure 16:
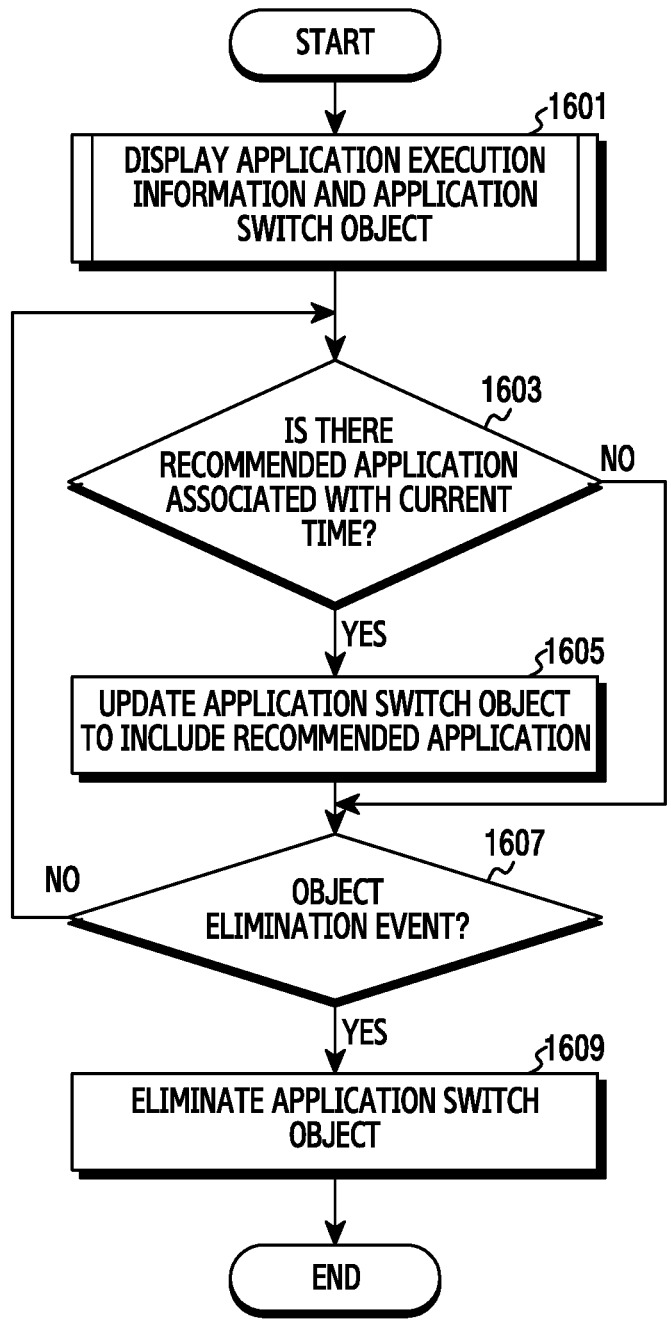
FIG. 16 is a flowchart illustrating a method by which an electronic device updates an application switch object based on time information according to various embodiments of the present disclosure.
Figure 17:
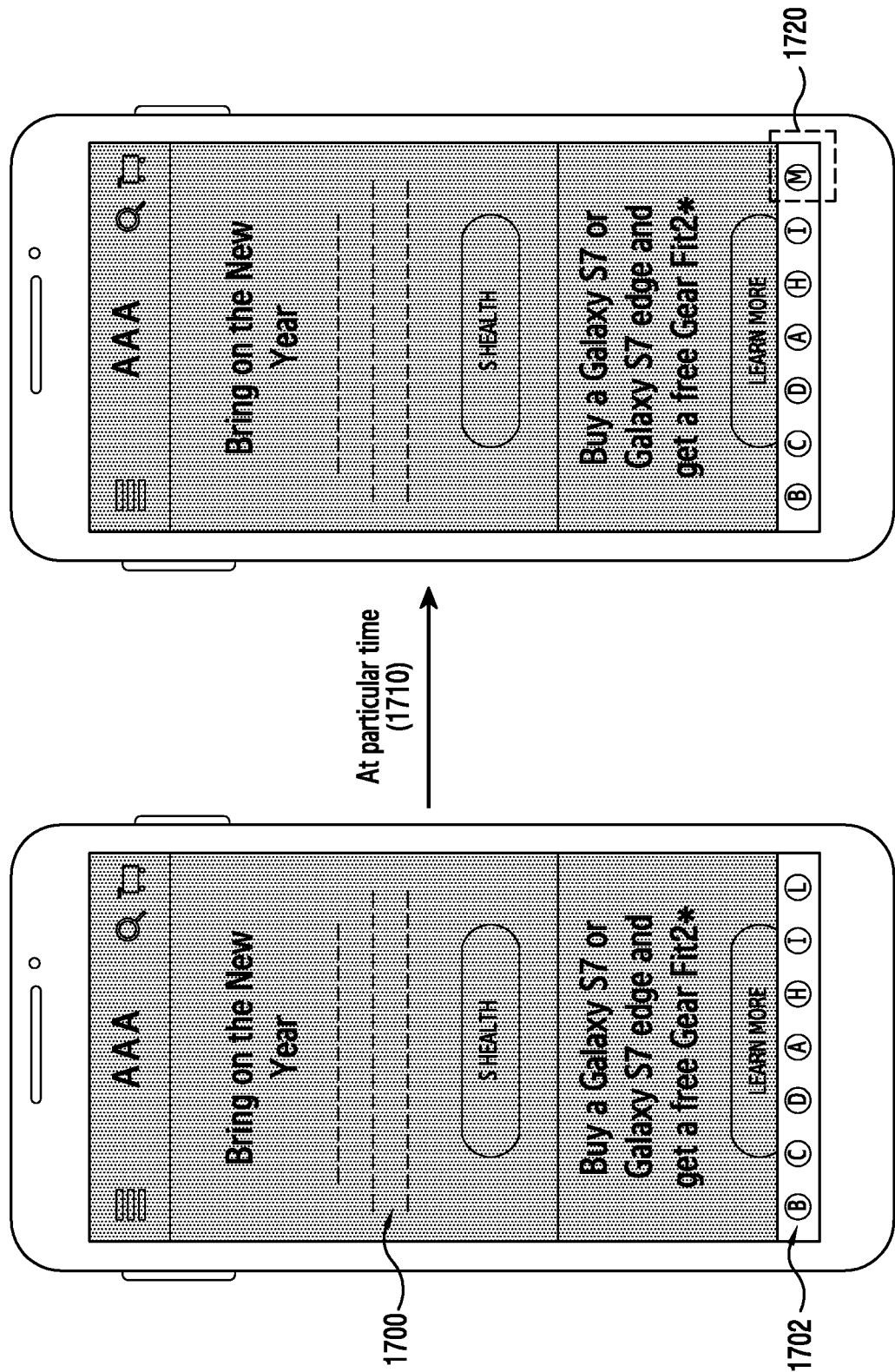
FIG. 17 is a diagram which illustrates the configuration of a screen for updating an application switch object based on time information in an electronic device according to various embodiments of the present disclosure.

FIG. 16 is a flowchart illustrating a method by which an electronic device updates an application switch object based on time information according to various embodiments of the present disclosure. FIG. 17 is a diagram which illustrates the configuration of a screen for updating an application switch object based on time information in an electronic device according to various embodiments of the present disclosure. In the following description, the electronic device may include the electronic device 101 of FIG. 1, or at least a part (e.g., the processor 120) of the electronic device 101.

In operation 1601 of FIG. 16, the electronic device displays application execution information and an application switch object in different areas of a display. For example, as shown in FIG. 17, the processor 120 may control the display 160 to display a service screen 1700 of a web browser in a first area of the display 160 and to display an application switch object 1702 in a second area.

In operation 1603, the electronic device determines whether there is a recommended application associated with the current time. For example, the processor 120 may identify whether there is a recommended application associated with a time period including the current time from the recommended application information stored in the memory 130. The recommended application associated with the time period including the current time may be, for example, an application that was repeatedly used a reference/threshold number of times or more during the same time period in the past. When there is a plurality of applications repeatedly used the reference/threshold number of times or more during the corresponding time period, the processor 120 may prioritize the applications based on at least one of application execution frequency and application execution time. The processor 120 may set at least one application of a relatively high priority as a recommended application associated with the corresponding time period.

When there is no recommended application associated with the current time, as determined in operation 1603, the electronic device determines whether an event for eliminating an application switch object occurs in operation 1607.

When there is a recommended application associated with the current time, as determined in operation 1603, the electronic device updates the application switch object to include the recommended application associated with the current time in operation 1605. For example, referring to FIG. 17, when at a particular time period (1710) associated with a recommended application, the processor 120 selects a recommended application of a relatively low priority among the recommended applications in the recommended applications list of the application switch object 1702 to change to the recommended application associated with the current time. Specifically, the processor 120 controls the display to change object/icon L of the selected recommended application of the lowest priority in the recommended applications list included in the application switch object 1702 to object/icon M 1720 of the recommended application associated with the current time.

In operation 1607, the electronic device determines whether an event for eliminating an application switch object occurs. For example, the processor 120 may identify whether at least one of a button input, a touch motion input, and a pressure input matched with an event for eliminating an application switch object is detected.

When no event for eliminating an application switch object occurs, as determined in operation 1607, the electronic device returns again to determine whether there is a recommended application associated with the current time in operation 1603. If it is determined that an event for eliminating the application switch object occurs at operation 1607, the electronic device eliminates the application switch object at operation 1609 and the method ends.

According to various embodiments of the present disclosure, an electronic device may change an object/icon of at least one recommended application in an application switch object to an object/icon of an application corresponding to a current place, current time, and/or a notification event. For example, the electronic device may replace an object/icon of an application of the relatively lowest priority on the recommended applications list of the application switch object with an object/icon of an application corresponding to a current place, current time, and/or a notification event. That is, the electronic device places an object/icon of an application corresponding to a current place, current time, and/or a notification event on the recommended application list.

FIGS. 18A to 18D are diagrams which illustrate the configuration of a screen for scrolling an application switch object in an electronic device according to various embodiments of the present disclosure.

Figure 18A:
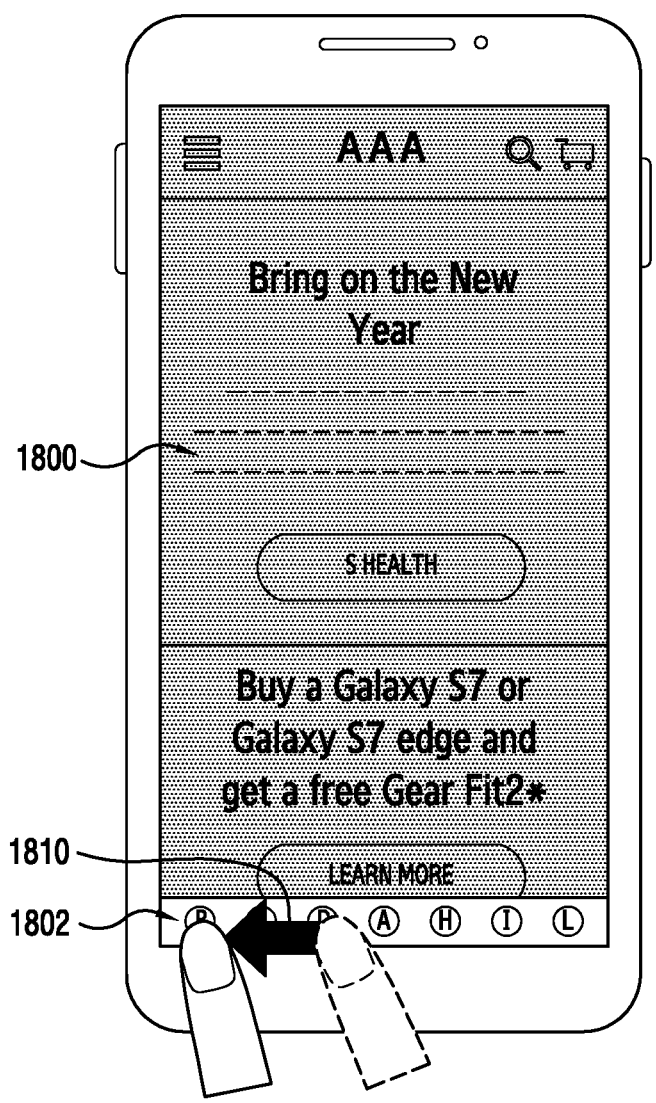
FIGS. 18A to 18D are diagrams illustrating the configuration of a screen for scrolling an application switch object in an electronic device according to various embodiments of the present disclosure.

In FIG. 18A, the electronic device displays a service screen 1800 of a web browser running on the electronic device in a first area of the display and displays an application switch object 1802 in a second area. The usage history of the application switch object 1802 includes objects/icons B, C, and D corresponding to three recently executed applications. The recommended applications list of the application switch object 1802 includes objects/icons H, I, and L corresponding to applications of relatively higher priorities among the recommended applications installed in the electronic device.

Figure 18B:
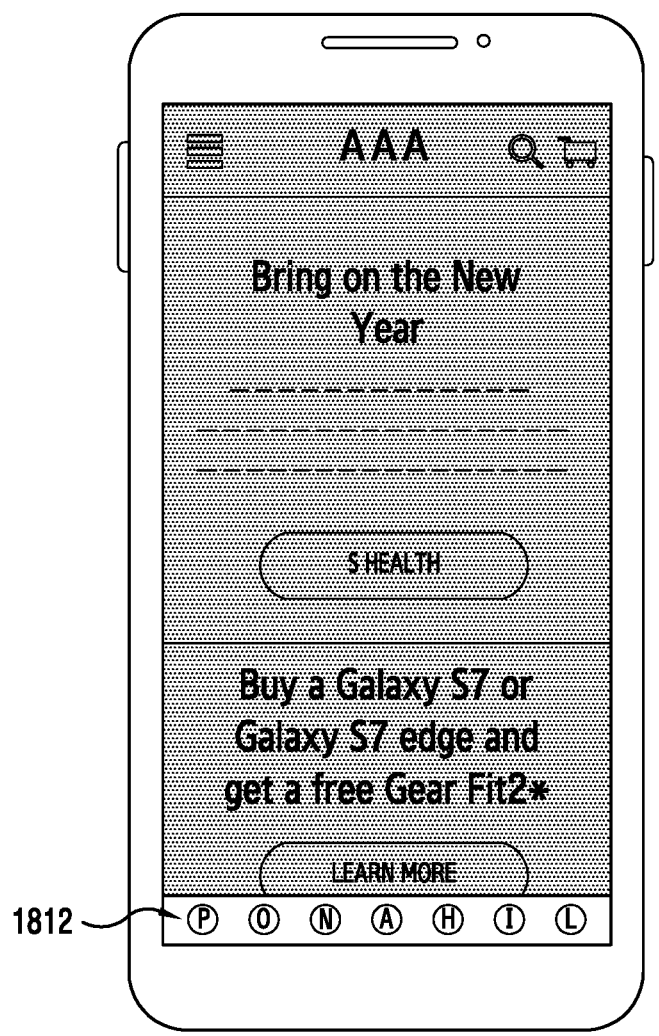

In FIG. 18A, the electronic device detects a touch motion input 1810 on the displayed application usage history of the application switch object 1802, which scrolls the applications in the usage history of the application switch object 1802. Specifically, when the touch motion input 1810 in the left direction is detected, the usage history of the application switch object 1802, which consists of objects/icons B, C, and D in FIG. 18A, changes to objects/icons P, O, and N (1812) in FIG. 18B corresponding to three applications sequentially executed before the application corresponding to the object/icon B. Further, when a touch motion input in the right direction on the displayed usage history of objects/icons P, O, and N displayed in FIG. 18B is detected, the displayed usage history of the application switch object 1802 may switch back to objects/icons B, C, and D in FIG. 18A corresponding to the applications sequentially executed before the application corresponding to object/icon N.

Figure 18C:
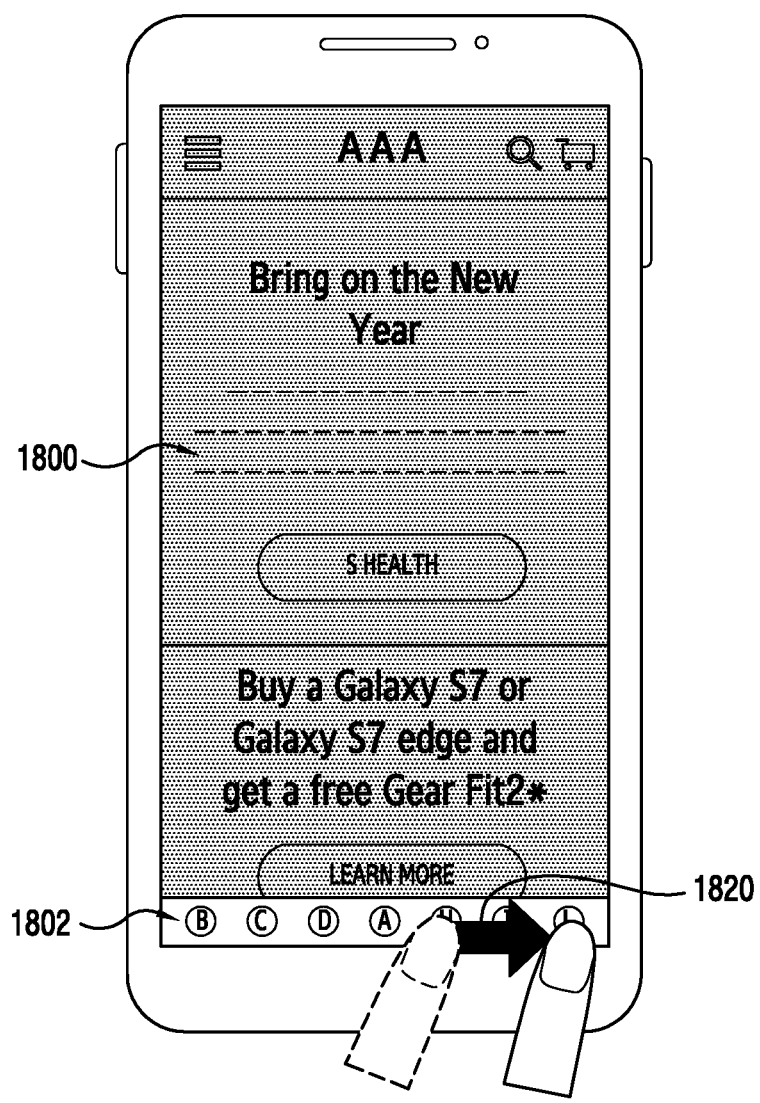
Figure 18D:

In FIG. 18C, the electronic device detects a touch motion input 1820 on the recommended applications list of the application switch object 1802, which scrolls the recommended applications displayed in the recommended applications list of the application switch object 1802. Specifically, when the touch motion input 1820 on the displayed recommended applications is detected going towards the right direction, the displayed recommended applications of the application switch object 1802 change from objects/icons H, I, and L in FIGS. 18B and 18C to objects/icons Q, R, and S 1822 of FIG. 18D of applications with lower priorities than the application corresponding to object/icon L. Further, when a touch motion input is detected in the left direction on objects/icons Q, R, and S displayed in FIG. 18D, the recommended applications list of the application switch object 1802 changes back to objects/icons H, I, and L in FIG. 18C corresponding to applications of higher priorities than the application corresponding to the object/icon Q.

An electronic device and an operating method thereof according to various embodiments displays an application switch object in at least a portion of the display of the electronic device with application execution information (e.g., a service screen) displayed on the display of the electronic device, thereby providing the capability for a user to easily switch to another application while continuously maintaining the use of a running application displayed on the display.

An electronic device and an operating method thereof according to various embodiments displays an application switch object including an application usage history of the electronic device, information on a running application, and recommended application information (or a recommended applications list) in at least a portion of a display with application execution information (e.g., a service screen) displayed on the display of the electronic device, thereby enabling a user of the electronic device to easily find an application to switch to.

The term "module" as used herein may be a unit consisting of hardware, software, and/or firmware, and may, for example, be used interchangeably with the term "logic", "logical block", "component", "circuit", or the like. The "module" may be an integrated component, or a minimum unit for performing one or more functions or a partial function. The "module" may be mechanically or electronically implemented and may include, for example, an application-specific integrated circuit (ASIC) chip, a field-programmable gate array (FPGA), or a programmable-logic device, which are known or are to be developed in the future, for performing certain operations.

At least some devices (e.g., modules or functions thereof) or methods (e.g., operations) according to various embodiments of the present disclosure may be implemented by a program or instructions which are stored a non-transitory computer-readable storage medium (e.g., the memory 130 of FIG. 1). The instructions, when executed by one or more processors (e.g., the processor 120), may cause the one or more processors to execute functions corresponding to the program or instructions. The non-transitory computer-readable storage medium may be a hard disk, a floppy disk, a magnetic medium (e.g., magnetic tape), an optical medium, e.g., a compact disc (CD), a CD-ROM, a digital versatile disc (DVD), a magneto-optical medium (e.g., a floptical disk), an inner memory, etc. The instructions may include code made by a complier or code that can be executed by an interpreter.

Operations performed by components, modules, or other elements according to various embodiments of the present disclosure may be executed sequentially, in parallel, repeatedly, or in a heuristic manner. At least some operations/operations may be executed in a different order, may be omitted, or may further include other operations/operations.

The various embodiments disclosed herein are provided merely to easily describe technical details of the present disclosure and to help in understanding the present disclosure, and are not intended to limit the scope of the present disclosure. Therefore, it should be construed that all modifications and changes or modified and changed forms based on the technical idea of the present disclosure fall within the scope of the present disclosure.

What is claimed is:

1. An electronic device comprising:
a display; and
at least one processor configured to:
control the display to display an execution screen of a first application being presently executed,
while displaying the execution screen of the first application, receive an input for displaying an application switch object, and
in response to receiving the input, control the display to display the application switch object in at least a portion of the display while displaying the execution screen of the first application,
wherein the application switch object comprises at least one first object indicating at least one application corresponding to an application usage history of the electronic device, a second object indicating the first application, and at least one third object indicating at least one second application selected based on priorities of applications executable in the electronic device, and
wherein, in response to an occurrence of a notification event, the at least one third object having a lowest priority among the at least one third object is replaced with at least one fourth object indicating at least one third application corresponding to the notification event.

2. The electronic device of claim 1, wherein the display is configured to display the at least one first object, the second object, and the at least one third object in order in at least a portion of the display.

3. The electronic device of claim 1, wherein the application usage history indicates at least one fourth application executed before the first application is executed in the electronic device.

4. The electronic device of claim 3, wherein the at least one processor is further configured to select the at least one second application from among a plurality of applications installed in the electronic device excluding the at least one fourth application.

5. The electronic device of claim 4, wherein the at least one processor is further configured to select the at least one second application based further on at least one of application execution numbers, an application execution order, an application execution frequency, an application execution time, an application execution location, and an application execution duration of applications installed in the electronic device.

6. The electronic device of claim 1, wherein the at least one processor is further configured to control the display to update the execution screen of the first application based on another input associated with the first application.

7. The electronic device of claim 1, wherein the at least one processor is further configured to:
receive another input for selecting an object associated with the application switch object,
execute the third application indicated by the object based on the another input, and
control the display to display another execution screen of the third application.

8. The electronic device of claim 7, wherein the at least one processor is further configured to control the display to update at least part of the application switch object in response to execution of the third application.

9. The electronic device of claim 1, wherein the at least one processor is further configured to control the display to update at least part of the at least one third object based on at least one of a change in location of the electronic device and a current time.

10. The electronic device of claim 1, wherein the display is configured to display the execution screen of the first application in a first area of the display and displays the application switch object in a second area.

11. A method of an electronic device, comprising:
executing a first application;
displaying an execution screen of the first application on a display of the electronic device;

while displaying the execution screen of the first application, receiving an input for displaying an application switch object; and in response to receiving the input, displaying the application switch object in at least a portion of the display while displaying the execution screen of the first application, wherein the application switch object comprises at least one first object indicating at least one application corresponding to an application usage history of the electronic device, a second object indicating the first application, and at least one third object indicating at least one second application selected based on priorities of applications executable in the electronic device, and wherein, in response to an occurrence of a notification event, the at least one third object having a lowest priority among the at least one third object is replaced with at least one fourth object indicating at least one third application corresponding to the notification event.

12. The method of claim 11, wherein the application switch object is displayed as the at least one first object, the second object, and the at least one third object in order in at least a portion of the display.

13. The method of claim 11, wherein the application usage history indicates at least one fourth application executed before the first application was executed in the electronic device.

14. The method of claim 13, wherein the at least one second application comprises at least one application among a plurality of applications installed in the electronic device excluding the at least one fourth application.

15. The method of claim 14, wherein the at least one second application is selected based further on at least one of application execution numbers, an application execution order, an application execution frequency, an application execution time, an application execution location, and an application execution duration of applications installed in the electronic device.

16. The method of claim 11, further comprising:
determining whether another input associated with the first application is detected while displaying the application switch object; and
in response to determining that the another input is detected, updating the execution screen of the first application based on the another input.

17. The method of claim 11, further comprising:
determining whether another input for selecting an object associated with the application switch object is detected;
in response to determining the another input is detected, executing the third application indicated by the object based on the another input; and
displaying another execution screen of the third application.

18. The method of claim 17, further comprising:
updating at least part of the application switch object in response to execution of the third application.

19. The method of claim 11, further comprising:
updating at least part of the at least one third object based on at least one of a change in location of the electronic device and a current time.

20. The method of claim 11, wherein displaying the application switch object comprises:
determining a size for displaying the application switch object;
reducing a size of the execution screen of the first application based on the determined size for displaying the application switch object; and
displaying the application switch object in an area obtained by reducing the size of the execution screen of the first application.

* * * * *